(12) United States Patent
Hyams et al.

(10) Patent No.: US 10,909,080 B2
(45) Date of Patent: Feb. 2, 2021

(54) SYSTEM AND METHOD FOR IMPLEMENTING SHARED DOCUMENT EDITS IN REAL-TIME

(71) Applicant: Microsoft Technology Licensing, LLC., Redmond, WA (US)

(72) Inventors: Brian Gaiennie Hyams, Issaquah, WA (US); Michelle Elena Keslin, Kirkland, WA (US); Ali Taleghani, Seattle, WA (US); Jitesh Sachdeva, Bellevue, WA (US); Daniel Robert Snyder, Bellevue, WA (US); Amelie Dagenais, Kirkland, WA (US); Michal Piaseczny, Bellevue, WA (US); Jordan Spencer Rudd, Lynnwood, WA (US); Yessen Yessetovich Amirzhanov, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 14/751,765

(22) Filed: Jun. 26, 2015

(65) Prior Publication Data

US 2016/0328368 A1    Nov. 10, 2016

Related U.S. Application Data

(60) Provisional application No. 62/156,792, filed on May 4, 2015.

(51) Int. Cl.
*G06F 16/176* (2019.01)
*G06Q 10/10* (2012.01)
(Continued)

(52) U.S. Cl.
CPC ........ *G06F 16/1767* (2019.01); *G06F 40/166* (2020.01); *G06F 40/194* (2020.01); *G06F 40/197* (2020.01); *G06Q 10/101* (2013.01)

(58) Field of Classification Search
CPC ...................... G06F 17/30168; G06F 17/1767
See application file for complete search history.

(56) References Cited

U.S. PATENT DOCUMENTS 6,073,161 A * 6/2000 DeBoskey ........ G06F 17/30168
707/999.201
6,990,503 B1 * 1/2006 Luo ..................... G06F 16/2343
(Continued)

FOREIGN PATENT DOCUMENTS

JP        2005333682 A    12/2005
WO    WO-2017160545 A1 *  9/2017 ........... G06F 16/178

OTHER PUBLICATIONS

"International Search Report and Written Opinion Issued in PCT Application No. PCT/US2016/030484", dated Jun. 17, 2016, 11 Pages.
(Continued)

*Primary Examiner* — Kavita Padmanabhan
*Assistant Examiner* — Tyler Schallhorn
(74) *Attorney, Agent, or Firm* — Merchant & Gould P.C.

(57) ABSTRACT

Systems and methods for enabling the real-time sharing of document edits are disclosed herein. Documents being edited may use backing stores that are not originally compatible to share edits in a coauthoring environment and thus require additional attention before coauthoring edits can be shared in real-time. The systems and methods described may provide for the analysis of high level functions within the document editor to determine the underlying activities. Both the high level functions and underlying activities may be analyzed to determine whether it is safe to implement the changes they represent in real-time on an endpoint. When it
(Continued)

is determined that the changes are safe to implement, the changes will be implemented and further real-time edits will be shared. When it is determined that the edits are not safe to implement, real-time updates will be suspended until the next selected-time update, at which time real-time sharing will recommence.

17 Claims, 22 Drawing Sheets

(51) Int. Cl.
  *G06F 40/166* (2020.01)
  *G06F 40/194* (2020.01)
  *G06F 40/197* (2020.01)

(56) References Cited

U.S. PATENT DOCUMENTS

| | | | |
|---|---|---|---|
| 7,424,671 B2* | 9/2008 | Elza | G06F 17/2241 715/234 |
| 7,451,396 B2 | 11/2008 | Storisteanu | |
| 7,596,620 B1 | 9/2009 | Colton et al. | |
| 7,653,721 B1 | 1/2010 | Romanov et al. | |
| 7,698,274 B1* | 4/2010 | Maluf | G06F 17/24 707/999.009 |
| 7,730,394 B2 | 6/2010 | Davis et al. | |
| 7,769,810 B1* | 8/2010 | Kaufman | G06F 17/30165 709/205 |
| 8,010,946 B2 | 8/2011 | Zaky et al. | |
| 8,429,521 B2* | 4/2013 | Lloyd | G06F 17/246 715/212 |
| 8,453,052 B1* | 5/2013 | Newman | G06F 17/2211 715/255 |
| 8,527,609 B2* | 9/2013 | Huang | G06F 17/2288 709/219 |
| 8,788,589 B2* | 7/2014 | Zarom | G06F 9/526 709/205 |
| 8,941,675 B2 | 1/2015 | Treat et al. | |
| 9,158,746 B2* | 10/2015 | Bartek | G06Q 10/10 |
| 9,270,715 B2* | 2/2016 | Zarom | G06F 9/526 |
| 9,560,130 B2* | 1/2017 | Mantri | H04M 3/42178 |
| 9,667,676 B1* | 5/2017 | Lo | H04L 65/4015 |
| 2002/0065848 A1* | 5/2002 | Walker | G06F 17/24 715/205 |
| 2002/0143644 A1 | 10/2002 | Tosun et al. | |
| 2003/0187964 A1 | 10/2003 | Sage et al. | |
| 2004/0024820 A1* | 2/2004 | Ozzie | G06Q 10/10 709/205 |
| 2004/0068505 A1* | 4/2004 | Lee | G06F 17/30168 |
| 2004/0103367 A1 | 5/2004 | Riss et al. | |
| 2005/0102364 A1* | 5/2005 | Ozzie | G06F 17/30168 709/207 |
| 2006/0064634 A1* | 3/2006 | Dettinger | G06F 40/194 715/255 |
| 2006/0074977 A1* | 4/2006 | Kothuri | G06F 16/2246 |
| 2007/0118598 A1* | 5/2007 | Bedi | G06Q 10/107 709/204 |
| 2007/0130145 A1 | 6/2007 | Pedersen et al. | |
| 2007/0186157 A1* | 8/2007 | Walker | G06F 17/24 715/234 |
| 2008/0250392 A1 | 10/2008 | Petri | |
| 2009/0021767 A1 | 1/2009 | Fujimaki | |
| 2009/0157811 A1* | 6/2009 | Bailor | G06F 17/30168 709/204 |
| 2010/0174783 A1* | 7/2010 | Zarom | G06F 9/526 709/205 |
| 2011/0078246 A1* | 3/2011 | Dittmer-Roche | G06F 17/2288 709/205 |
| 2011/0252301 A1* | 10/2011 | Vollmer | G06F 17/30994 715/229 |
| 2011/0258538 A1* | 10/2011 | Liu | G06F 17/2211 715/256 |
| 2011/0307772 A1* | 12/2011 | Lloyd | G06F 17/2247 715/212 |
| 2012/0084341 A1* | 4/2012 | Mantri | H04M 3/42178 709/203 |
| 2012/0117194 A1* | 5/2012 | Huang | G06F 17/2288 709/219 |
| 2013/0191451 A1* | 7/2013 | Tse | G06Q 10/101 709/204 |
| 2013/0219256 A1* | 8/2013 | Lloyd | G06F 17/2247 715/212 |
| 2013/0262373 A1* | 10/2013 | Rampson | G06Q 10/10 707/608 |
| 2013/0339847 A1* | 12/2013 | Bartek | G06F 17/24 715/255 |
| 2014/0149384 A1* | 5/2014 | Krishna | G06F 17/30035 707/711 |
| 2014/0149554 A1* | 5/2014 | Krishna | G06F 17/3002 709/219 |
| 2014/0149592 A1* | 5/2014 | Krishna | G06F 1/329 709/226 |
| 2014/0149599 A1* | 5/2014 | Krishna | H04L 69/08 709/232 |
| 2014/0157113 A1* | 6/2014 | Krishna | G06F 17/289 715/249 |
| 2014/0215302 A1 | 7/2014 | Little | |
| 2014/0337760 A1 | 11/2014 | Heinrich | |
| 2015/0052427 A1* | 2/2015 | Vagell | G06F 40/166 715/256 |
| 2015/0134737 A1* | 5/2015 | Albrecht | H04L 12/1822 709/204 |
| 2015/0256638 A1* | 9/2015 | Schwartz | H04L 65/4015 709/203 |
| 2015/0278245 A1* | 10/2015 | Sagar | G06F 17/30174 707/610 |
| 2016/0117298 A1* | 4/2016 | Lemonik | G06F 17/248 715/229 |
| 2016/0173594 A1* | 6/2016 | Nelson | H04L 67/1095 709/205 |
| 2016/0380817 A1* | 12/2016 | Agarwal | H04L 41/0813 709/221 |
| 2017/0169066 A1* | 6/2017 | Mantri | G06F 17/30362 |
| 2018/0075057 A1* | 3/2018 | Lopez | G06F 16/1774 |
| 2018/0285326 A1* | 10/2018 | Goyal | G06F 40/166 |
| 2019/0065526 A1* | 2/2019 | Ribeiro | G11B 27/02 |

OTHER PUBLICATIONS

"Adobe InDesign Cs6 Plug—In Programming Guide vol. 2: Advanced Topics", Retrieved on: Apr. 13, 2015 Available at: http://wwwimages.adobe.com/content/dam/Adobe/en/devnet/indesign/sdk/cs6/plugin/plugin-programming-guide-vol2.pdf.

PCT Second Written Opinion Issued in PCT Application No. PCT/US2016/030484, dated Apr. 12, 2017, 05 Pages.

"International Preliminary Report on Patentability Issued in PCT Application No. PCT/US2016/030484", dated Jul. 10, 2017, 8 Pages.

* cited by examiner

SYSTEM AND METHOD FOR IMPLEMENTING SHARED DOCUMENT EDITS IN REAL-TIME

CROSS REFERENCES TO RELATED APPLICATIONS

This application claims the benefit of U.S. Provisional Patent Application No. 62/156,792, titled "Real-time Sharing of Document Edits" filed May 4, 2015.

BACKGROUND

Coauthoring documents, in which editors share changes made to a given document to endpoints, enables users of given systems to collaborate in the creation and editing of documents. Coauthoring, however, is not a native feature to all document editing systems, and how each system handles coauthoring may vary drastically. Additionally, different changes made by an editor may require different amounts of processing to faithfully and safely implement on an endpoint.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods for enabling the real-time sharing of document changes in a coauthoring environment are disclosed herein. In a coauthoring environment, changes to a document may be shared between an editor and an endpoint. An editor may be a software application or device at which a change to a document originates, and an endpoint may be a software application or device to which the change is transmitted for incorporation or display. As will be understood, multiple editors and endpoints may simultaneously transmit and receive changes to a given document, and a given software application or device may simultaneously be an editor and an endpoint within a coauthoring environment. The systems and methods described herein may be incorporated into the editors, the endpoints, both the editors and endpoints, or be provided as a server-based service to the coauthors.

When a change is made by an editor, the document displayed on an endpoint may be updated either in real-time or in selected-time to reflect that change. Real-time updates enable the endpoint to display the change while it is being made on the editor. In contrast, selected-time updates enable the endpoint to display changes made since the last selected-time update occurred. Example selected-time updates may occur when the document is saved, either on a periodic/scheduled basis (e.g., auto-saved) or when a user manually selects to save the document. Depending on the frequency of selected-timed updates, the time between entry of a change on the editor and its display on the endpoint may vary.

Real-time updates are transmitted to enable the endpoint to display the editing processes of the editor while the editor makes those changes. Not all changes, however, are safe to implement on the endpoint in real-time; a change may be too large or too complex with respect to a given document's backing store to be implemented in real-time. Whether a real-time update is safe to implement on the endpoint therefore must be determined so that the document backing store is not corrupted by implementing the change, and so that the endpoint accurately incorporates or displays the change made by the editor. Both the high level activities and the low level activities that comprise a change may be analyzed to determine whether a change is safe to implement in real-time on an endpoint.

When a safe real-time update is transmitted, it may be implemented on the endpoint, and the endpoint may continue to accept real-time updates to that section of the document or make changes to that section of the document (e.g., as a concurrent editor). However, when a change that is unsafe to implement in real-time on the endpoint is made by the editor, the section in which the change was made is frozen on the endpoint until a selected-time update occurs. While a section is frozen, only the editor continues to see changes made in real-time and may continue to make changes to that section; real-time updates for that section are suspended on endpoints, and endpoints may not be concurrent editors to that section until it is unfrozen. Freezing one section of a document, however, does not affect the other sections; the other sections of the document will not be frozen on the endpoint, which may continue to accept real-time updates and make changes to those sections of the document. In various aspects, various status indicators may be used to indicate to the editor or to the endpoints that a section is frozen.

By enabling editors and endpoints to coauthor in real-time when changes are safe, an improved user experience is provided; users of applications or devices that could not otherwise concurrently coauthor all changes to a document are enabled to coauthor a subset of changes to documents in real-time and all changes in selected-time. Additionally, the functionalities of a network or a coauthoring application or device are improved by reducing network traffic when coauthoring changes that are unsafe to implement in real-time, and by improving the reliability of the applications or devices used when coauthoring.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1A:
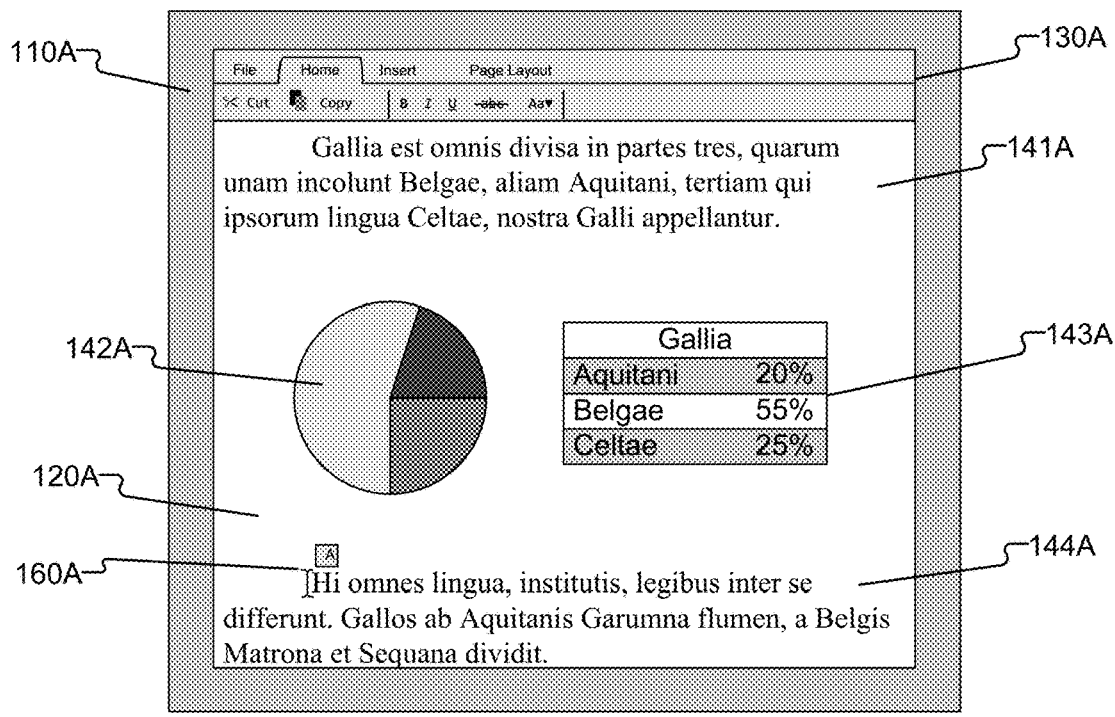
FIGS. 1A-N illustrate an example coauthoring environment in which various changes are made to a document in accordance with the present disclosure.
Figure 1A:
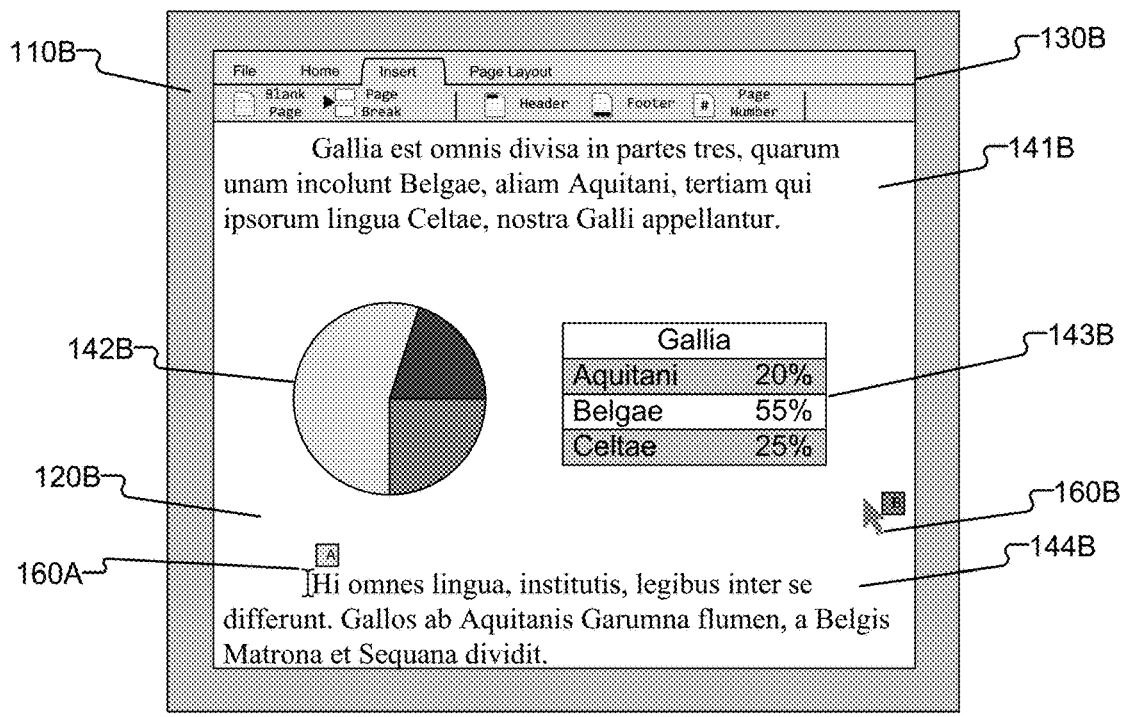

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Systems and methods for enabling the real-time sharing of document edits in a coauthoring environment are disclosed herein. In a coauthoring environment, changes to a document may be shared between an editor and an endpoint. An editor may be a software application or device at which a change to a document originates, and an endpoint may be a software application or device to which the change is transmitted for display. As will be understood, multiple editors and endpoints may simultaneously transmit and receive changes to a given document, and a given software application or device may simultaneously be an editor and an endpoint. The systems and methods described herein may be incorporated into the editors, the endpoints, both the editors and endpoints, or be provided as a server-based service to the coauthors.

When a change is made, the document displayed on the endpoint may be updated either in real-time or in selected-time. Real-time updates enable the endpoint to display the change while it is being made on the editor. In contrast, selected-time updates enable the endpoint to display changes made since the last selected-time update occurred. Example selected-time updates may occur when the document is saved, either on a periodic/scheduled basis (e.g., auto-saved) or when a user manually selects to save the document. Depending on the frequency of selected-time updates, the time between entry of a change on the editor and its display on the endpoint may vary.

Real-time updates are transmitted to enable the endpoint to display the editing processes of the editor while the editor makes those changes. Not all changes, however, are safe to implement on the endpoint in real-time; a change may be too large, too complex, etc., with respect to a given document's backing store to implement in real-time. Whether a real-time update is safe to implement on the endpoint therefore must be determined so that the document backing store is not corrupted by implementing the change and the endpoint accurately displays the change made by the editor. Both the high level functions and underlying low level activities may be analyzed to determine whether a change is safe to implement in real-time on an endpoint.

When a safe real-time update is transmitted, it is implemented on the endpoint, and the endpoint may continue to accept real-time updates to that section of the document and make changes to that section of the document (e.g., as a concurrent editor). However, when a change that is unsafe to implement in real-time on the endpoint is made by the editor, the section in which the change was made is frozen on the endpoint until a selected-time update occurs. While a section is frozen, only the editor continues to see changes made in real-time and may continue to make changes to that section; real-time updates for that section are suspended on endpoints and endpoints may not be concurrent editors to that section until it is unfrozen. Freezing one section of a document, however, does not affect the other sections; the other sections of the document will remain unfrozen on the endpoint, which may continue to accept real-time updates and make changes to those sections of the document. In various aspects, various status indicators may be used to indicate to the editor or to the endpoints that a section is frozen.

By enabling editors and endpoints to coauthor in real-time when changes that are safe, an improved user experience is provided; users of applications or devices that could not otherwise concurrently coauthor all changes to a document are enabled to coauthor a subset of changes to documents in real-time and all changes in selected-time. Additionally, the functionalities of a network or a coauthoring application or device are improved by reducing network traffic when coauthoring changes that are unsafe to implement in real-time, and by improving the reliability of the applications or devices used when coauthoring. Therefore, a computer using the present disclosure may improve the functioning of the computer itself or effect an improvement in a network or another computer.

Figure 1B:
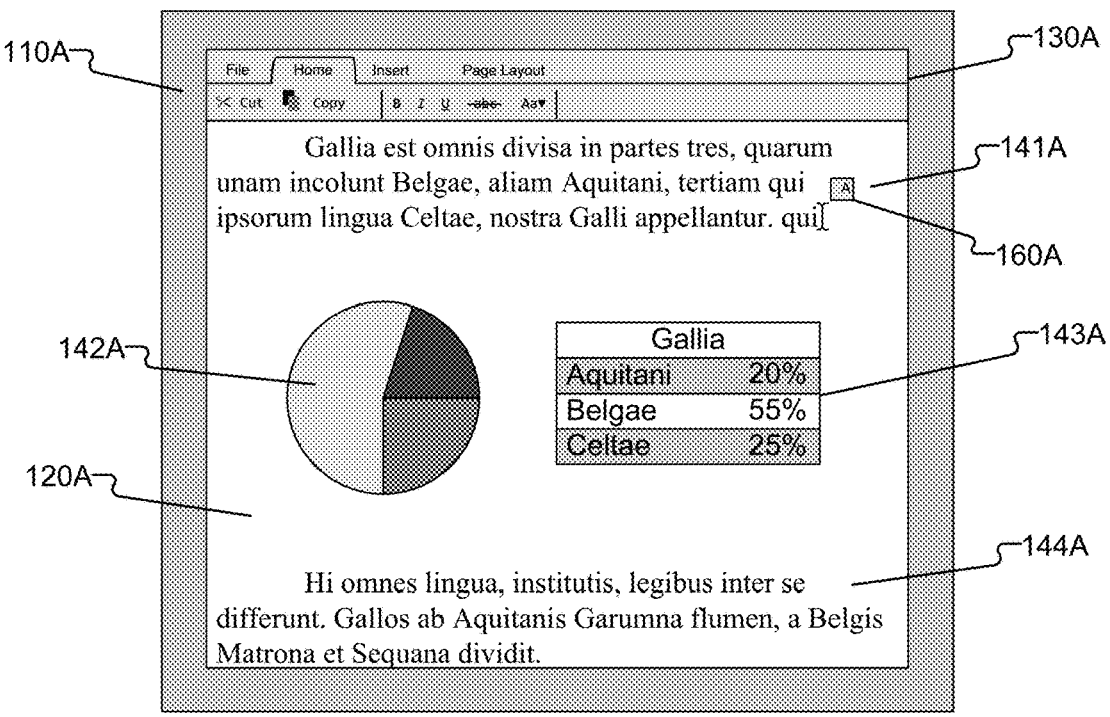
Figure 1B:
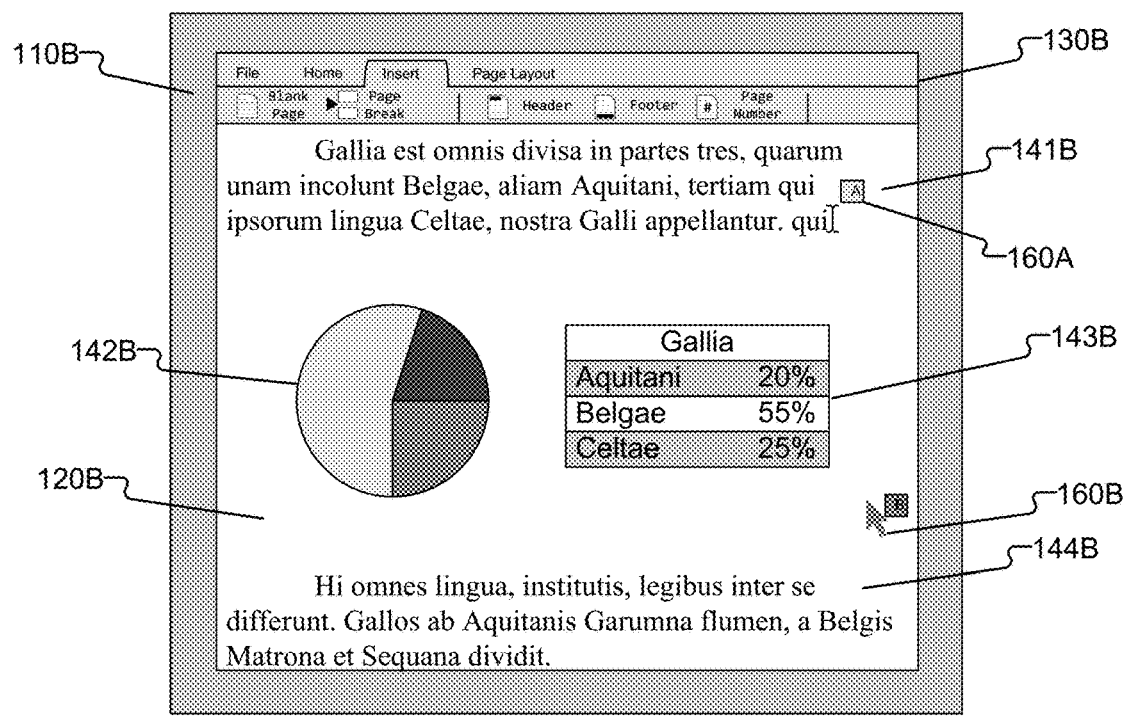
Figure 1C:
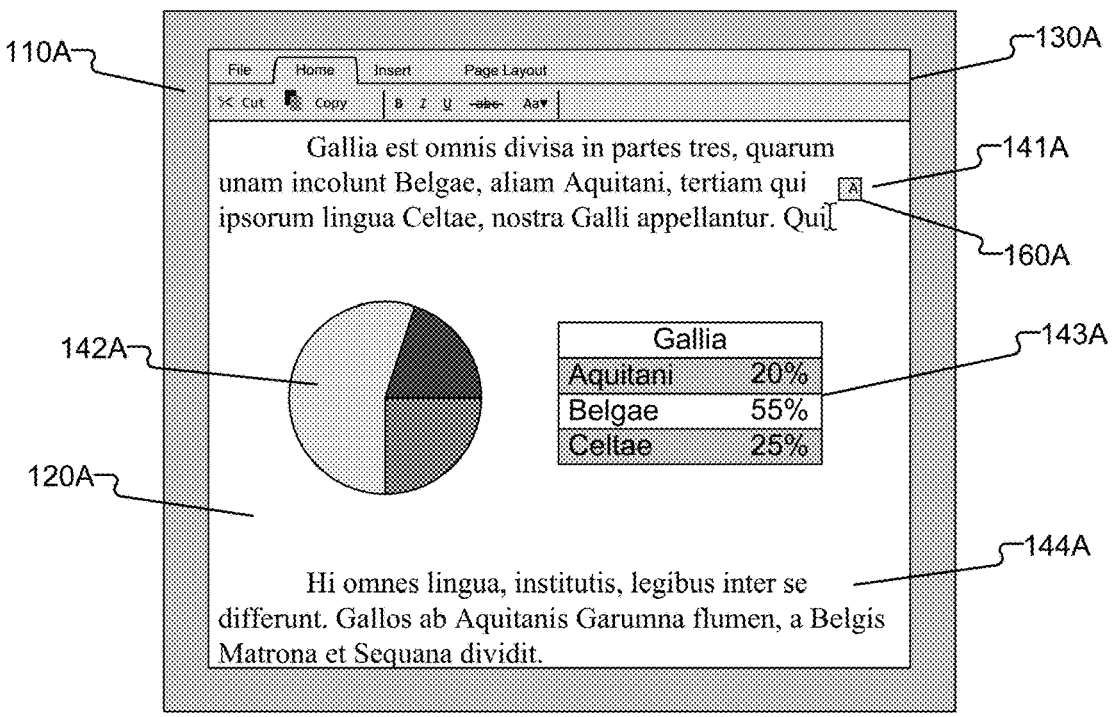
Figure 1C:
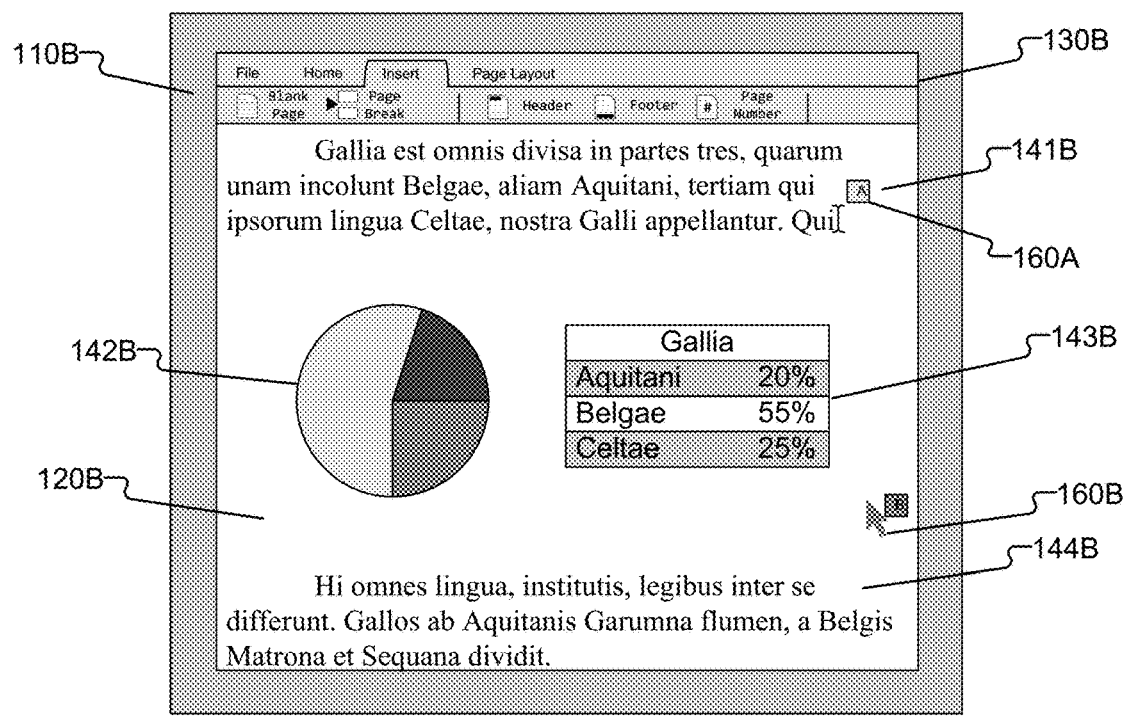
Figure 1D:
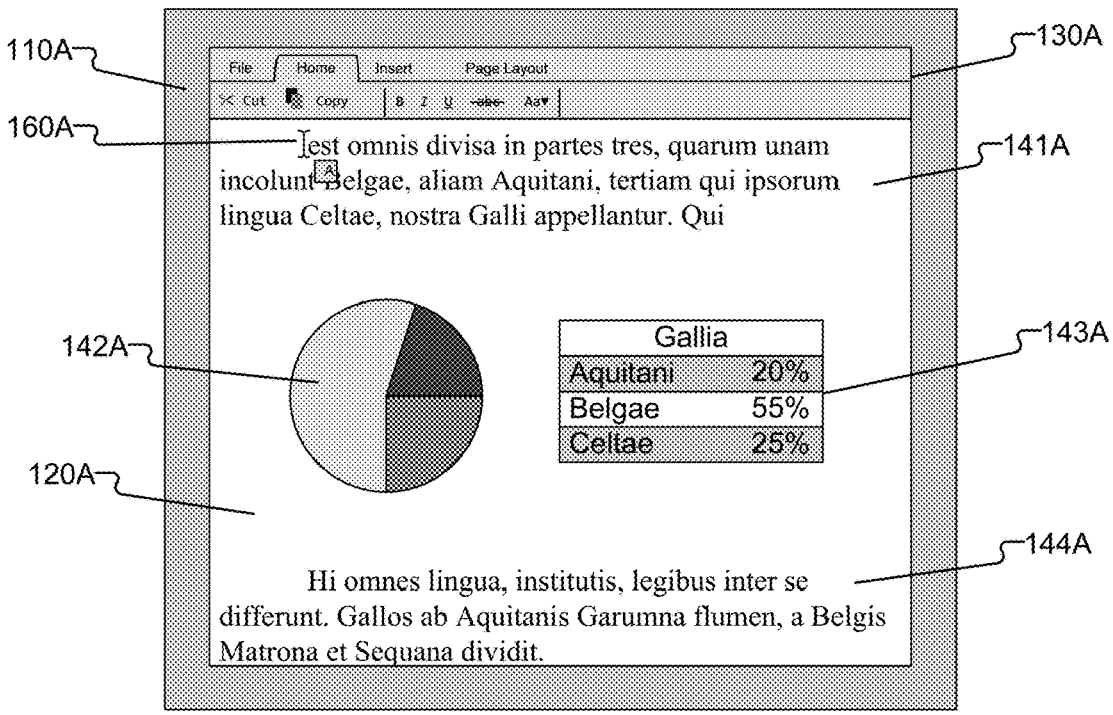
Figure 1D:
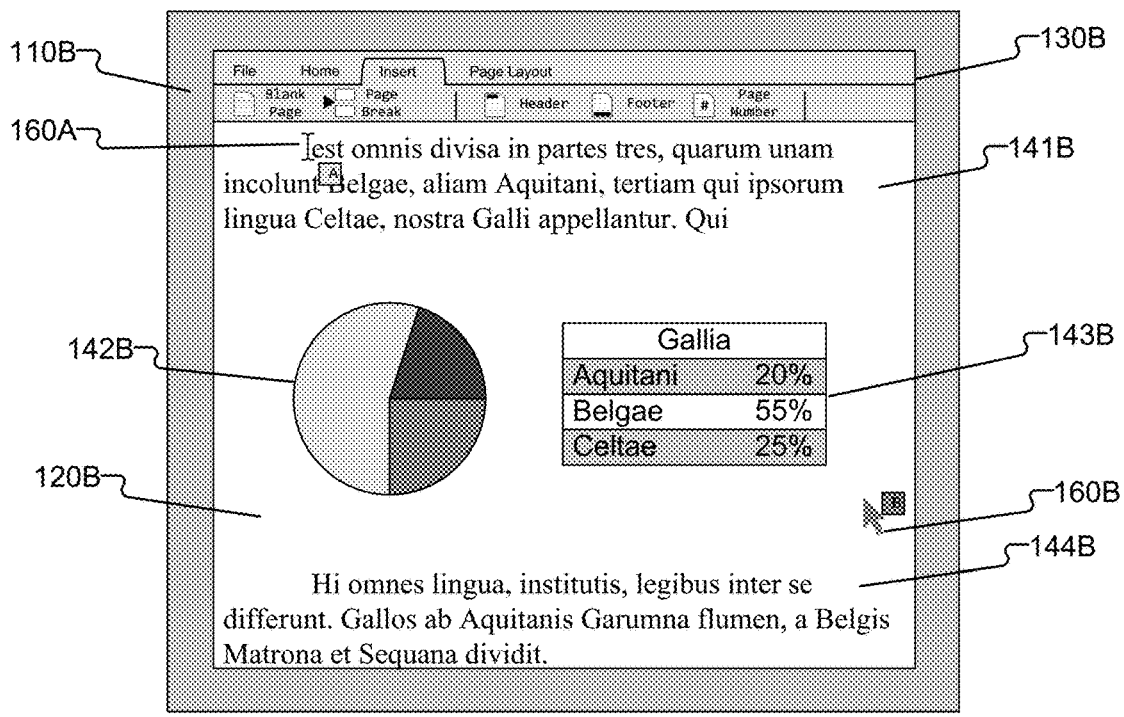
Figure 1E:
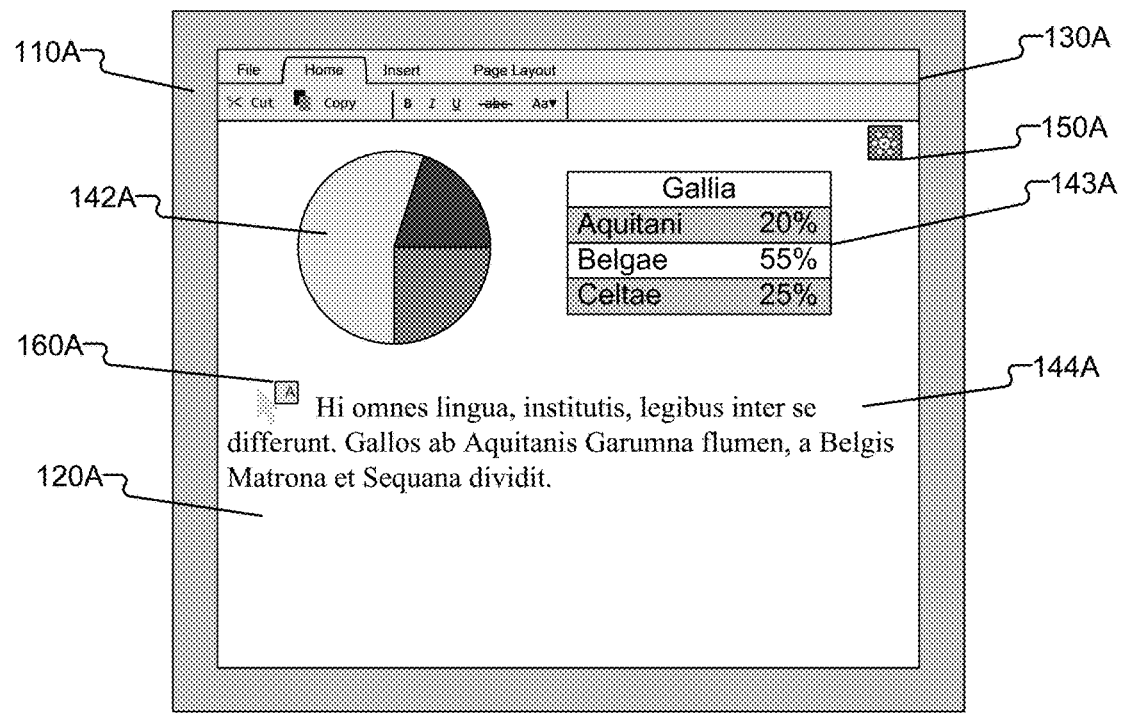
Figure 1E:
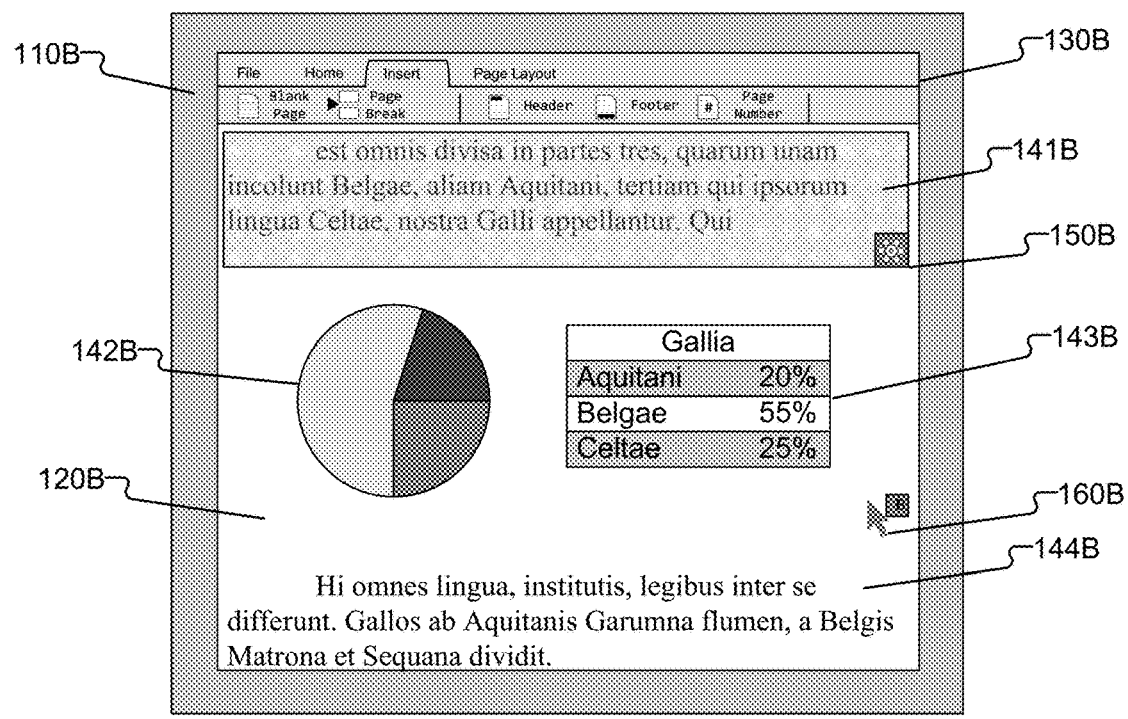
Figure 1F:
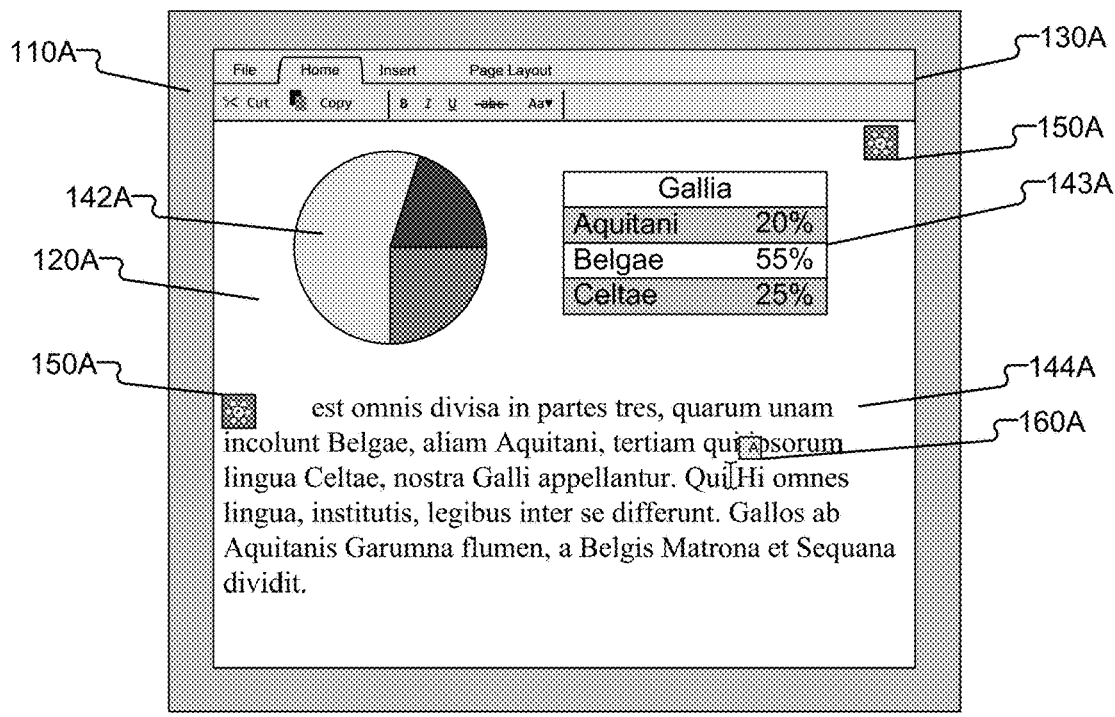
Figure 1F:
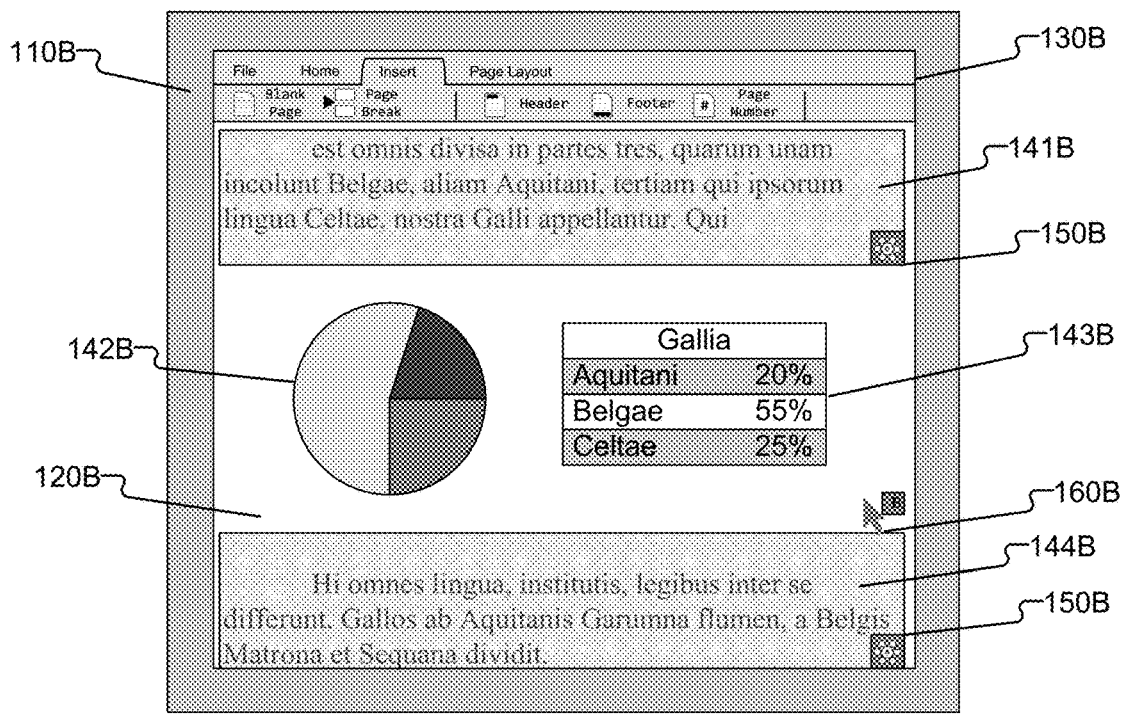
Figure 1G:
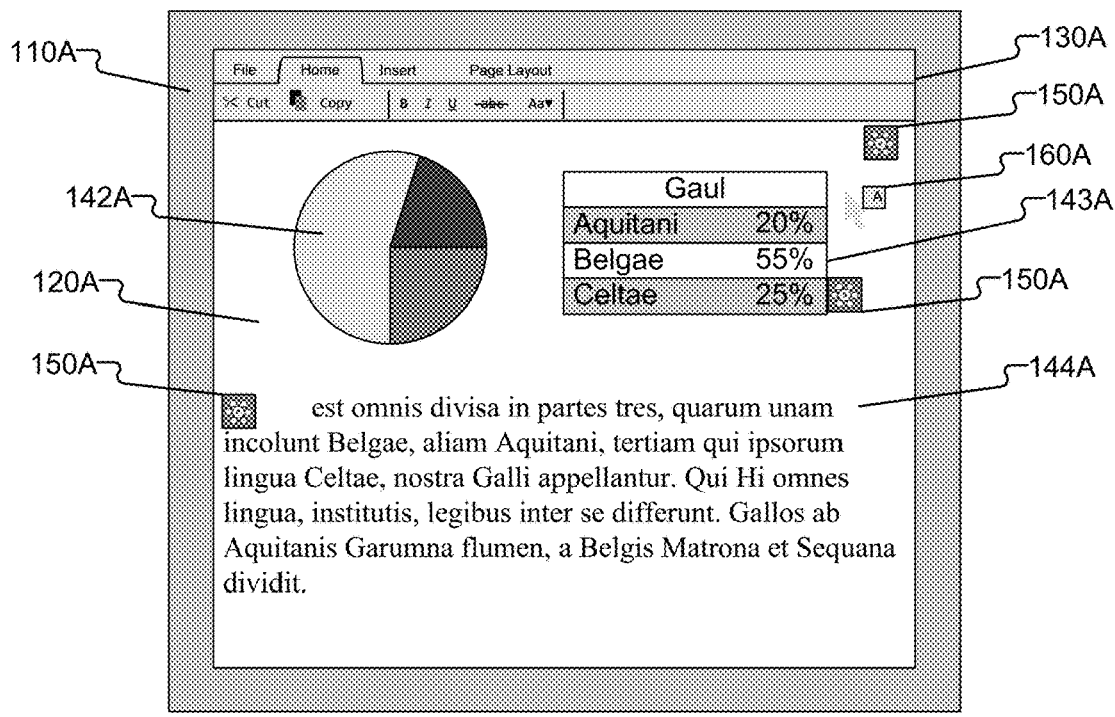
Figure 1G:
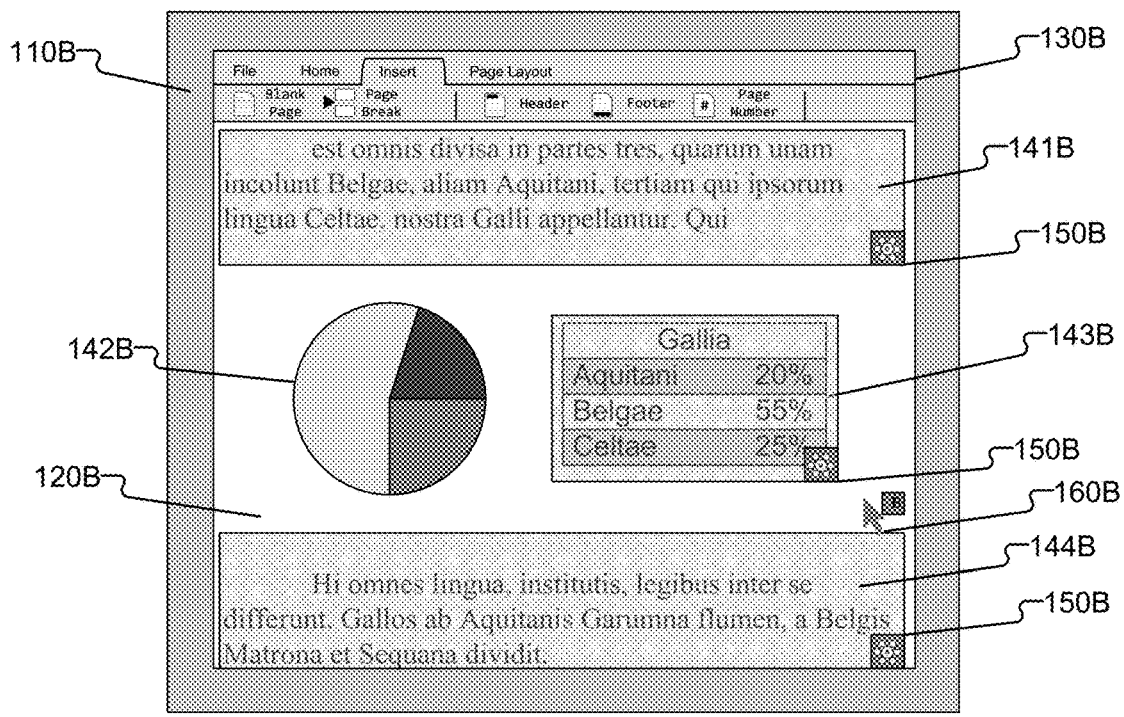
Figure 1H:
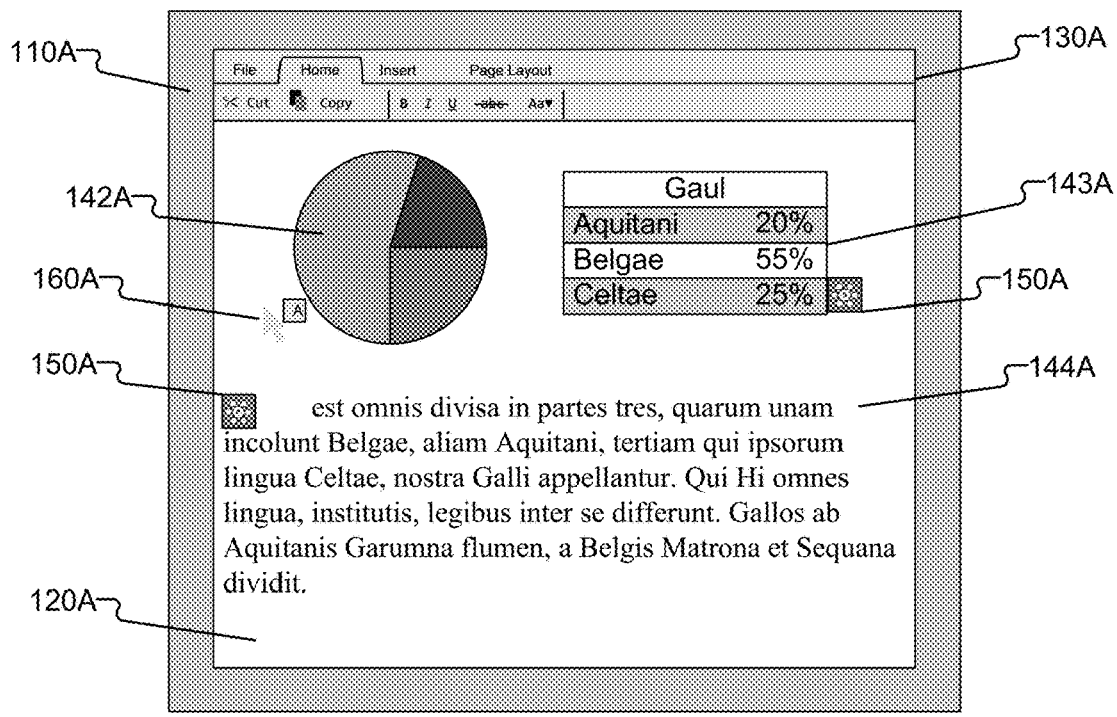
Figure 1H:
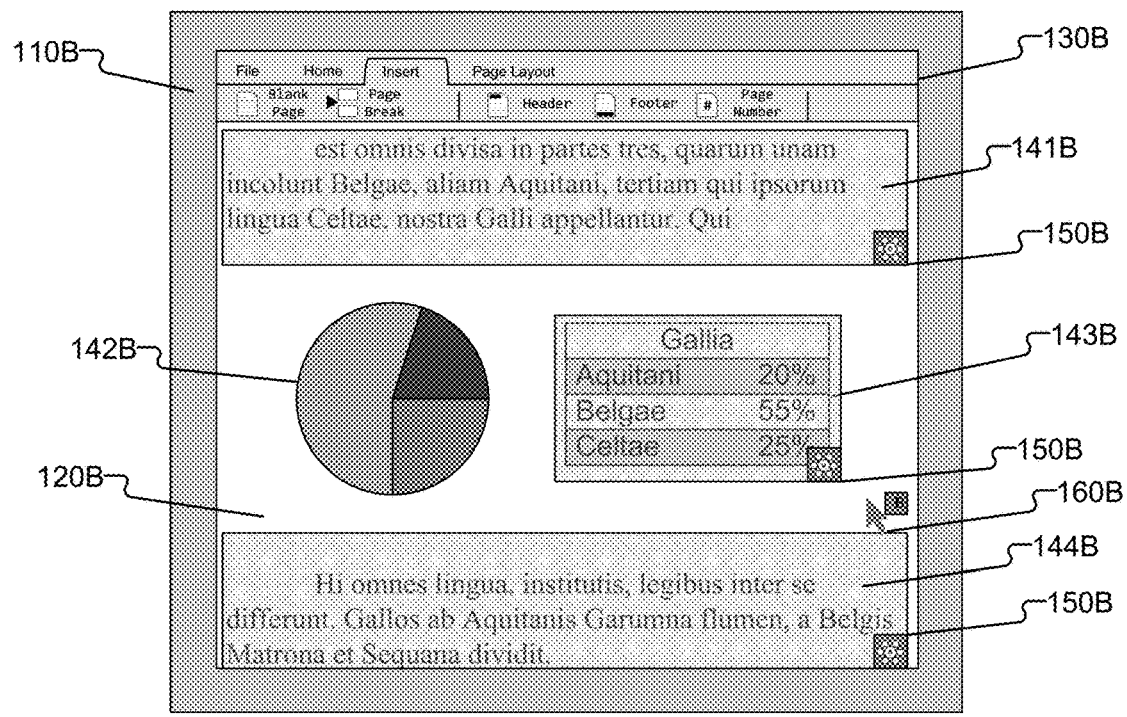
Figure 1I:
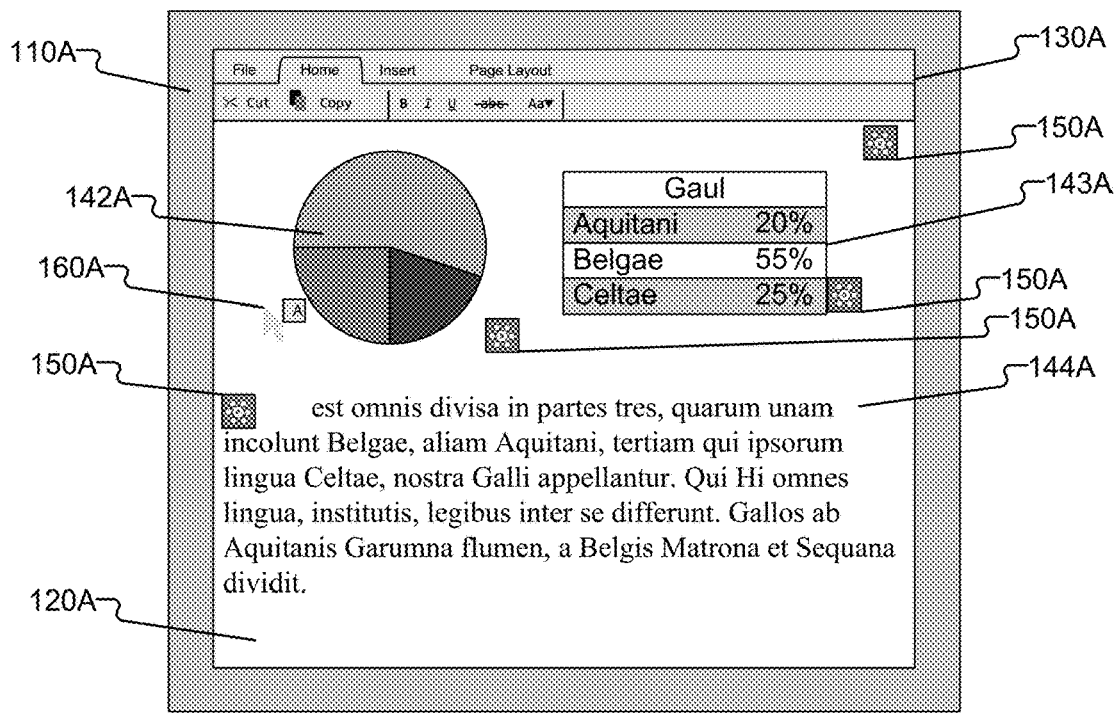
Figure 1I:
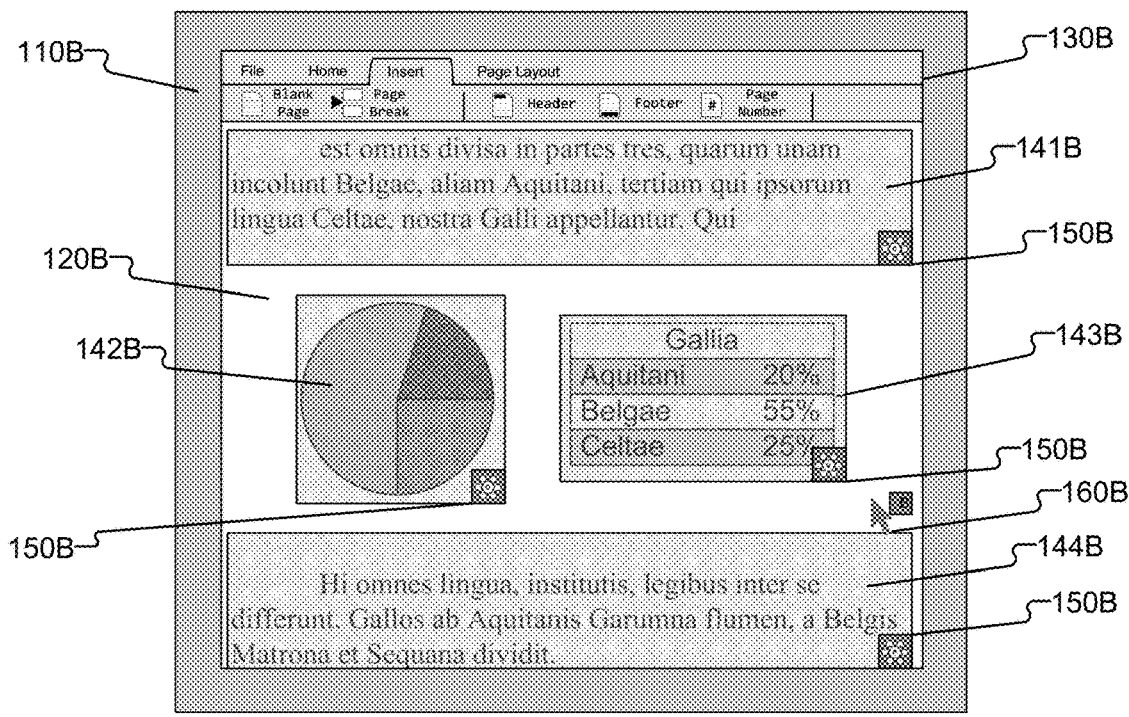
Figure 1J:
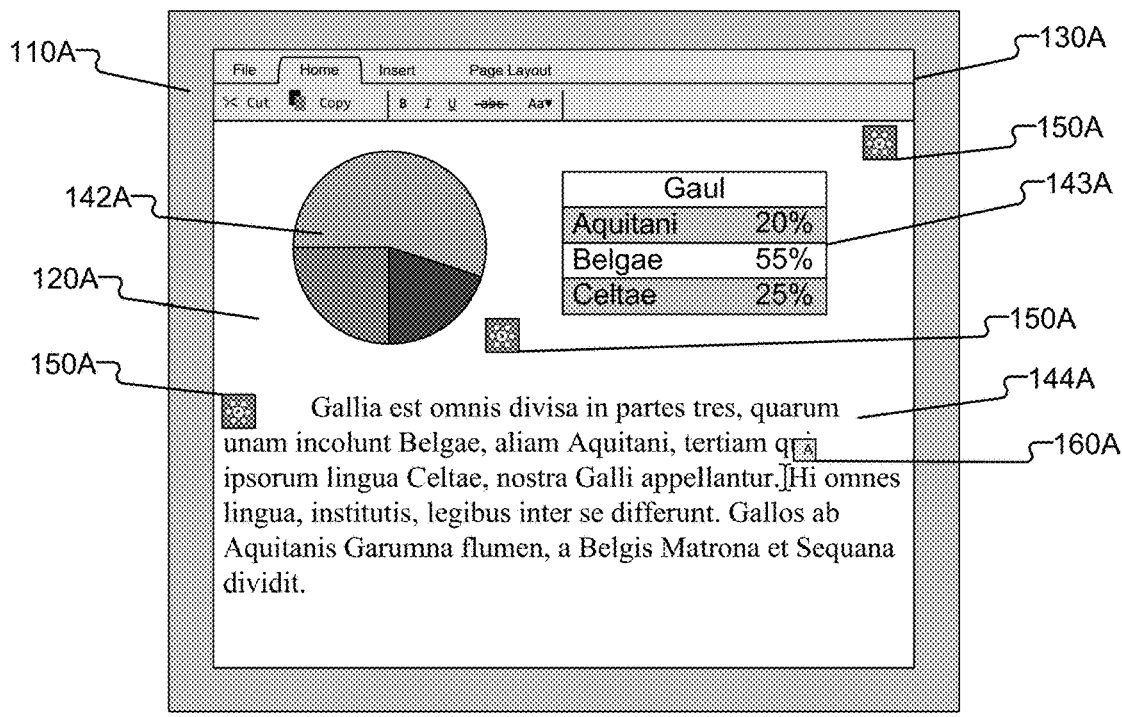
Figure 1J:
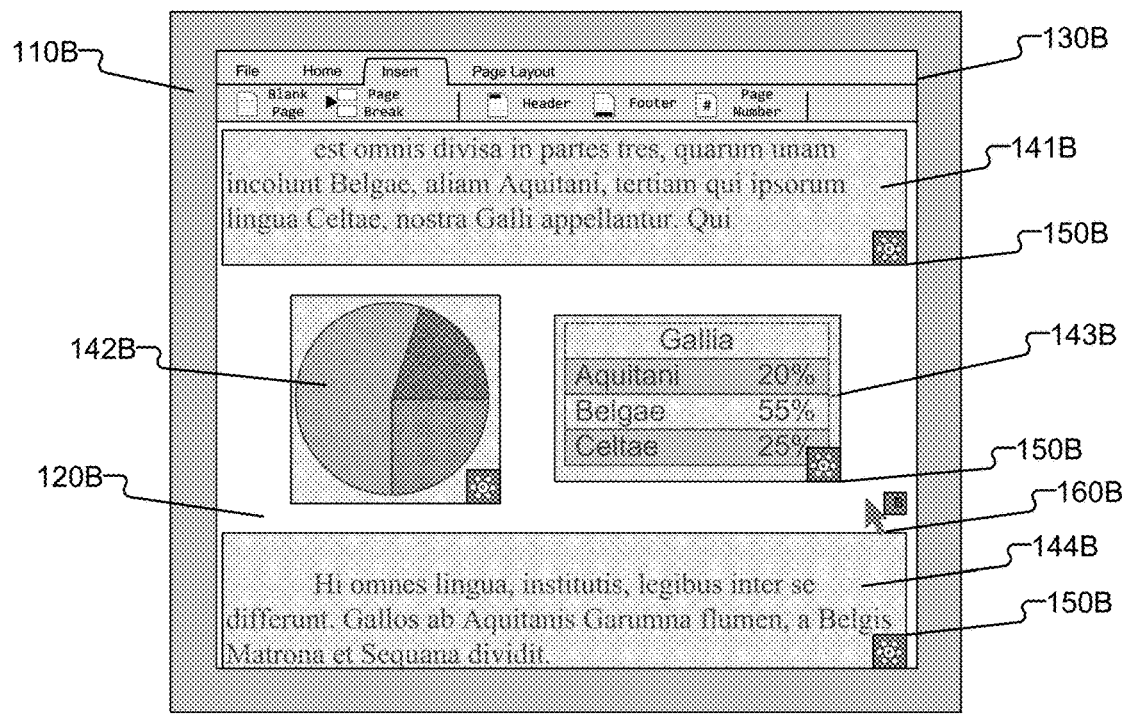
Figure 1K:
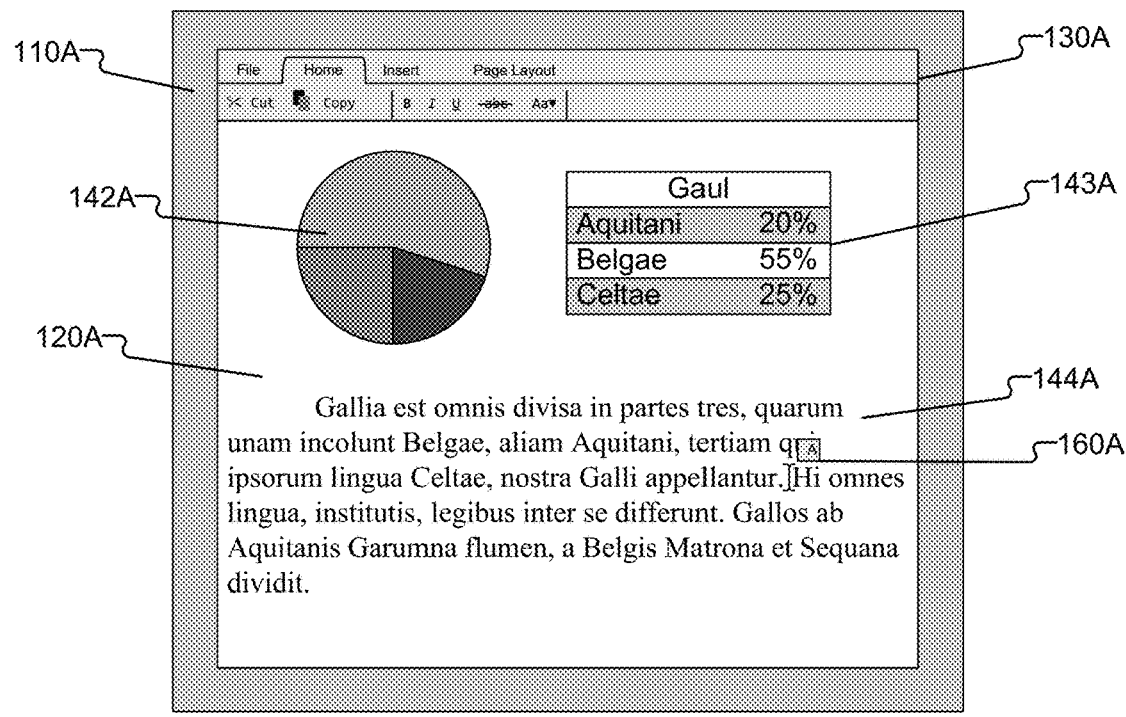
Figure 1K:
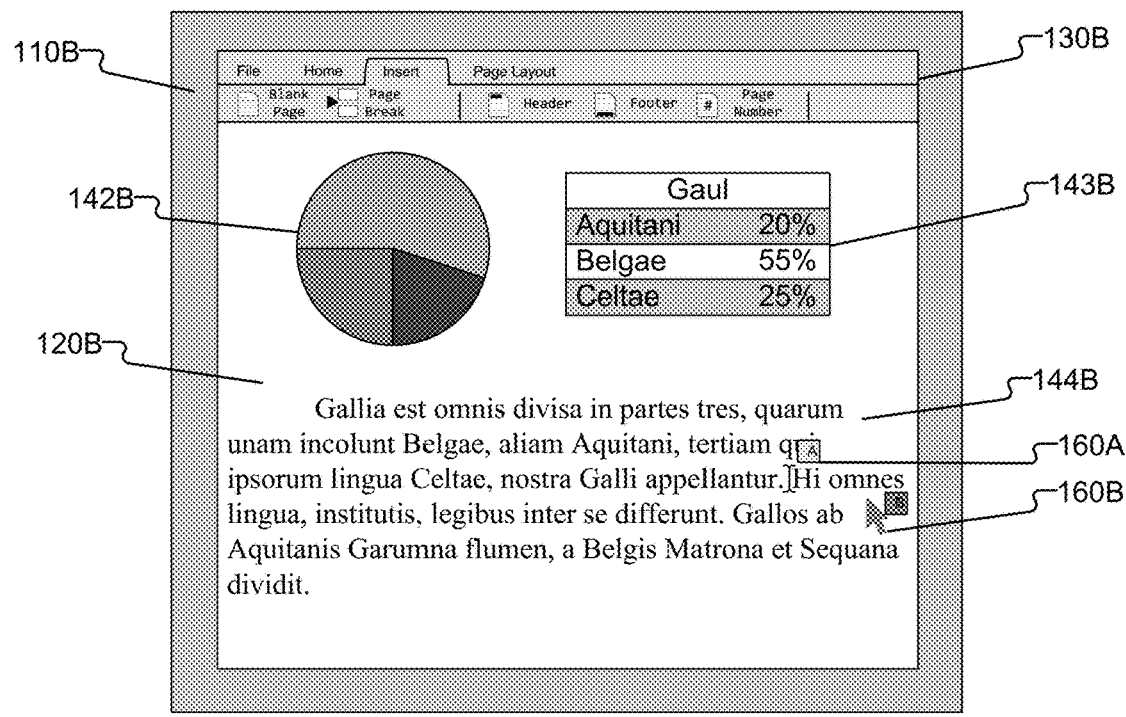
Figure 1L:
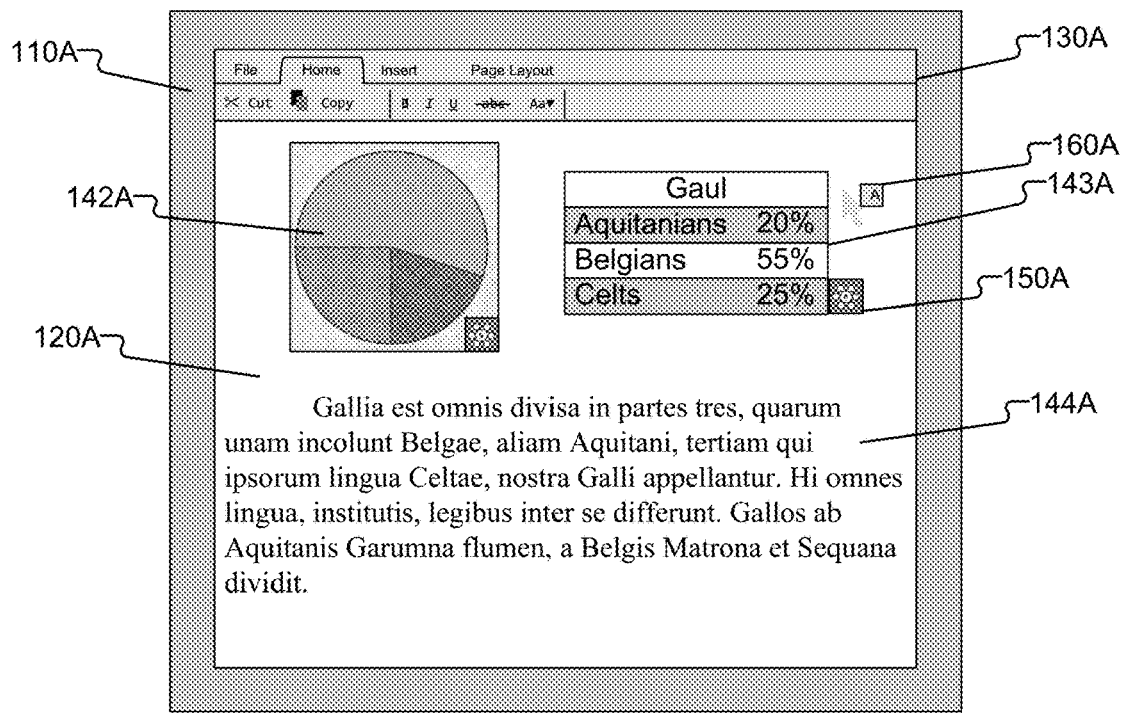
Figure 1L:
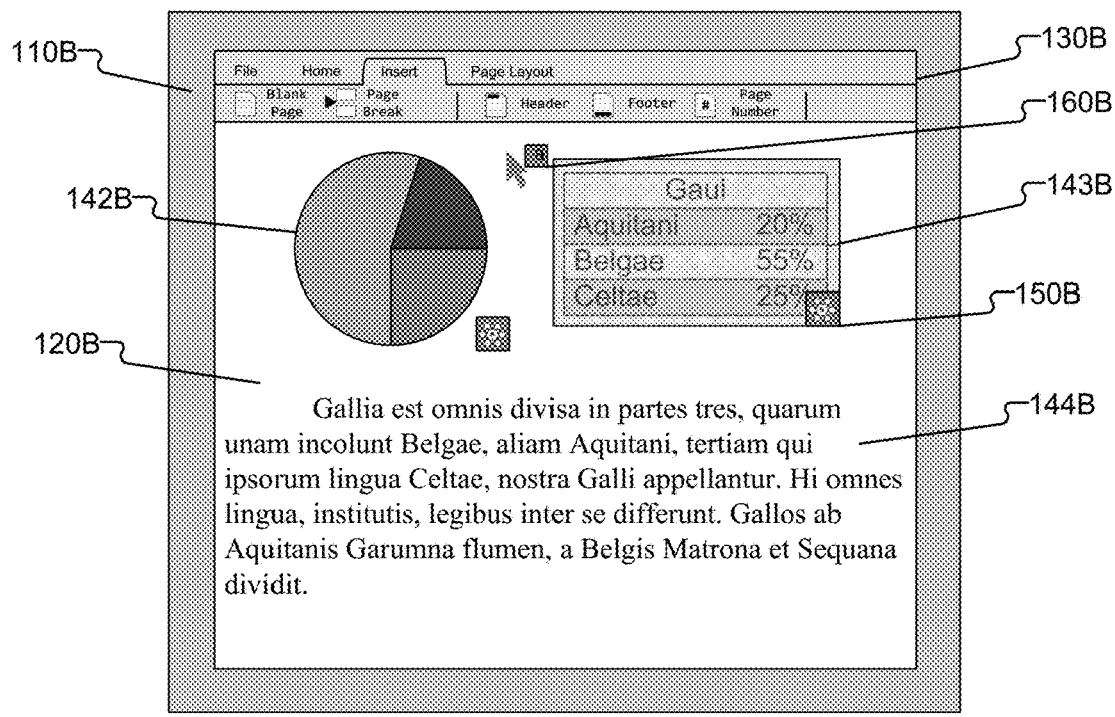
Figure 1M:
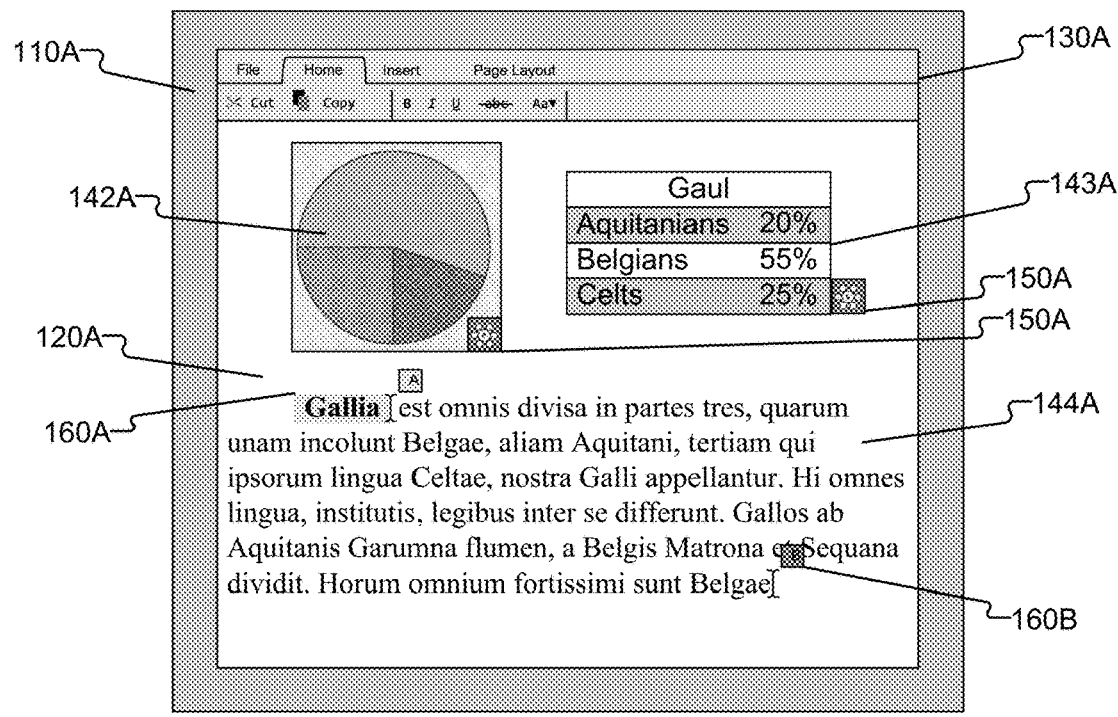
Figure 1M:
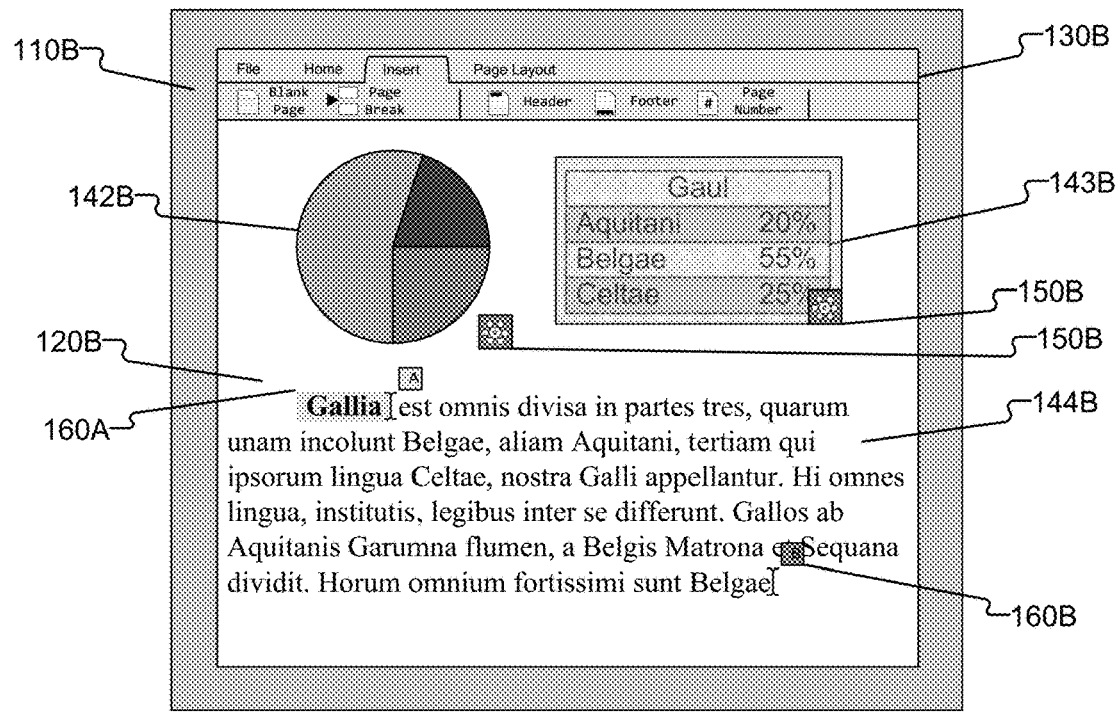
Figure 1N:
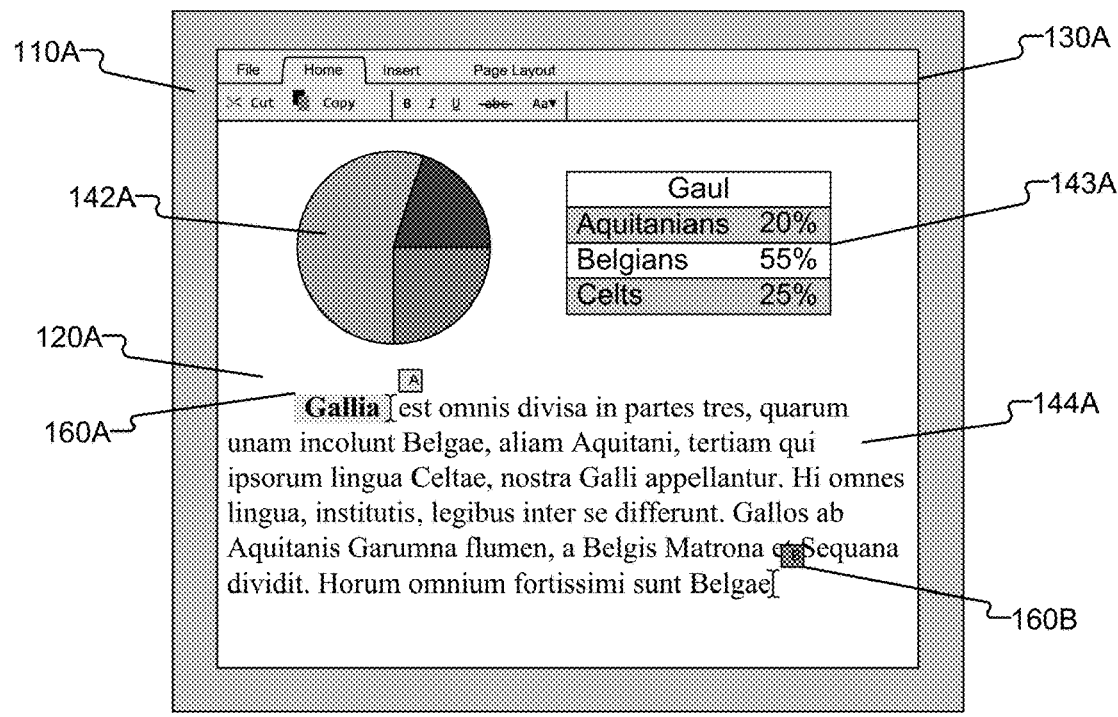

FIGS. 1A-N illustrate an example coauthoring environment 100 in which various changes are made to a document in accordance with the present disclosure. For the purpose of introducing concepts and functionalities of the present disclosure, the FIGS. 1A-N illustrate various example coauthoring functions in a step-by-step fashion. FIGS. 1B-J illustrate changes made by an editor (top) to an endpoint (bottom) and FIGS. 1L and 1M illustrate that the implementation of changes may be done simultaneously in a coauthoring environment 100; a device or application that is an endpoint may simultaneously be an endpoint, and vice versa.

FIG. 1A illustrates a beginning state of the example coauthoring environment 100. A first computing device 110A and a second computing device 110B (collectively referred to as computing devices 110) are illustrated as displaying identical copies of a document 120A and 120B respectively (collectively referred to as documents 120). The first computing device 110A is illustrated as providing a user interface (UI) 130A (collectively referred to as UI 130) for the first document 120A, and the first document 120A is illustrated as including several sections 141A, 142A, 143A, and 144A. Similarly, the second computing device 110B is illustrated as providing a UI 130B for the second document 120B, and the second document 120B is illustrated as including several sections 141B, 142B, 143B, and 144B. Both computing devices 110 are illustrated as providing cursors 160A and 160B (collectively referred to as cursors 160), which are operable to indicate where individual authors have focus in the documents 120.

As will be understood, both the first computing device 110A and the second computing device 110B may be an editor and may be an endpoint, and more computing devices 110 than illustrated may participate in a coauthoring environment 100. In various aspects, computing devices 110 may include, but are not limited to: personal computing devices, tablets, mobile computing devices, servers, virtual machines, etc. Computing devices 110 may include input devices (e.g., keyboards, touch screens, mice, etc.) and output devices (e.g., display screens, printers, speakers, etc.). As will be understood, depending on the characteristics of the output devices (e.g., aspect ratio, resolution, color settings, zoom level, volume, etc.), identical content may be output differently to different users without affecting the underlying content.

The documents 120 are illustrated as including several sections. Each section corresponds to a portion of the backing store of the document 120 on which it resides. Illustrated in the first document 120A is a first paragraph 141A, an image object 142A, a table object 143A, and a second paragraph 144A. Similarly, a first paragraph 141B, an image object 142B, a table object 143B, and a second paragraph 144B are illustrated in the second document 120B. Each illustrated section in one document 120 corresponds to the similarly named section in the other document 120 (e.g., first paragraph 141A corresponds to first paragraph 141B, etc.). Because the documents 120 are illustrated in FIG. 1A as identical copies, each section is displayed as having identical content to its corresponding section. Sections may include any logical division supported by the document backing store provisioning the document 120 and may include subsections (i.e., sections within sections). Example sections include, but are not limited to: documents, pages, paragraphs, sentences, words, tables, charts, images, text boxes, fields, footnotes, endnotes, comments, headers, footers, etc. As will be understood, the sections illustrated herein are given for purpose of example, and more or fewer sections than illustrated and more or fewer types than illustrated may be provisioned by documents 120.

The documents 120 are illustrated as being provisioned with UIs 130. The UIs 130 may be provisioned according to various styles, including, but not limited to: ribbons, menus, palettes, etc. Each computing device 110 may provision differently configured UIs 130 and users may navigate the UIs 130 without impacting the document 120 or other computing devices. As is illustrated, a user of the second computing device 110B has navigated to a different portion of the UI 130B than the user of the first computing device 110A has navigated to. Changes may be applied to documents 120 via user selection of the elements from the UIs 130, for example, applying a "Bold" style to a range of text via a UI element, typing via keyboard, copy/paste via keyboard, using accessibility function, inserting a chart via a subroutine called by a UI element, etc.

The cursors 160 illustrated in the documents 120 indicate to users where they and their coauthors have focus in the document 120. As will be understood, a different cursor 160 will be provided for each coauthor, and each cursor 160 will be visually distinct from the other cursors 160 to aid in identifying the coauthor associated with the cursor 160. In various aspects, cursors for different users may be differentiated by various means, including, but not limited to different: flags, colors, shapes, and combinations thereof. As illustrated herein, when focus is in text, a first cursor 160A for a user of the first computing device 110A is displayed in the first document 120A and second document 120B as a text-input cursor with a light gray flag displaying the shape of a letter "A", which may include a highlight for selected objects/text having the same color. Similarly, when text has not been selected, a mouse-style pointer having the same coloration and labeling as the text-input cursor may be used as the first cursor 160A. When a mouse-style pointer is used by one coauthor, it may not be displayed to the other coauthors; a focus may be required to display the cursor 160 to remote coauthors, for example, the second cursor 160B is only shown as a mouse-style cursor on the second computing device 110B, whereas the first cursor 160A is shown on both computing devices 110. A second cursor 160B is illustrated to convey in the first document 120A and the second document 120B where the user of the second computing device 110B has focus, which is illustrated herein as having a dark gray color and displaying a flag containing the shape of a letter "B" to differentiate the display of the first cursor 160A from the second cursor 160B.

FIG. 1B illustrates a progression from FIG. 1A in which a word is typed via the first computing device 110A. As illustrated, the word "qui" is typed at the end of the first paragraph 141A. If it is determined that it is safe to implement typing from the first computing device 110A on the second computing device 110B in real-time, the change is implemented in first paragraph 141B as a real-time update. According to aspects, a user of the second computing device 110B when implementing a real-time update would see the word "qui" as though it were typed on the second computing device 110B; each letter may appear separately (i.e., 'q' then 'u' then 'i').

FIG. 1C illustrates a progression from FIG. 1B in which an autocorrect action is applied. Because the word typed in the discussion of FIG. 1B is at the start of a sentence and was not capitalized by a user, an autocorrect action may occur to change the word "qui" to "Qui"—capitalizing it. The autocorrect action may be implemented by the first computing device 110A in response to detecting that the user has finished typing a word (e.g., has moved a cursor to a different word, object, or UI element; has entered a space character) based on rules in place on the first computing device 110A. For example, the first computing device 110A may have rules to autocorrect entered characters and words based on auto-formatting options, auto-spellchecking options, custom macros, etc. The second computing device 110B does not need to have the same autocorrect rules in place or enabled for the change affected by autocorrect on the first computing device 110A to be implemented on the second computing device 110B in real-time.

FIG. 1D illustrates a progression from FIG. 1C in which a word is deleted. As illustrated, the word "Gallia" is deleted by a user of the first computing device 110A from the beginning of the first paragraph 141A. According to various aspects, a user may delete each letter of the word "Gallia" on the first computing device 110A (e.g., by pressing a backspace key six times, by holding down the delete key), which may be displayed on the second computing device 110B similarly to how typing the characters were displayed in relation to FIGS. 1A and 1B (e.g., first paragraph 141B displays "Gallia", then "Galli", then "Gall", and so forth). According to another aspect, a user may delete the word as a single object (e.g., by selecting the word and pressing a delete or backspace key, by using a "cut" function).

FIG. 1E illustrates a progression from FIG. 1D in which a paragraph is deleted. As illustrated, the first paragraph 141A has been deleted from the first document 120A, for example, by selecting all content in the paragraph and performing a "cut" action (e.g., receiving a keyboard shortcut, receiving selection of an associated UI element), by selecting all content in the paragraph and performing a delete action (e.g., receiving selection of a backspace or delete key), individually deleting all elements within the paragraph (e.g., holding down the backspace or delete keys), etc.

In some aspects, deleting a paragraph may be an unsafe change to a document 120 that cannot be implemented in real-time on endpoints, for example when the paragraph defines a section or when its deletion affects too much content to be safely handled in a real-time update. When a change cannot be implemented safely in real-time on an endpoint, the section in which the change is made is frozen until a selected-time update occurs. In various aspects, freezing a section may result in a section being locked from editing on an endpoint, which may be indicated by graying out that section and providing various indicators 150, such as those illustrated in FIGS. 1E-1M, but in other aspects the frozen section is not presented differently than an unfrozen section until a user attempts to edit the frozen section.

As illustrated in FIG. 1E, the first paragraph 141A is deleted on the first computing device 110A and the change has not been implemented in the first paragraph 141B on the second computing device 110B. Instead, the first paragraph 141B displays the last implemented real-time changes, but has been frozen. Because the first paragraph 141B has been frozen, no subsequent changes to the corresponding first paragraph 141A will be implemented in first paragraph 141B and the user of the second computing device 110B cannot make changes to the first paragraph 141B until a selected-time update occurs.

The status of the first paragraph 141B being frozen may optionally be displayed on the first computing device 110A and the second computing device 110B by indicators 150A and 150B respectively (collectively referred to as indicators 150). As is illustrated in FIG. 1E, indicator 150A is displayed in the document 120A in the vicinity of the frozen section (or vicinity of the last location), to alert the user of the first computing device 110A that endpoints are no longer receiving updates to the indicated section in real-time. Similarly, indicator 150B alerts the user of the second computing device 110B that the indicated section is frozen and no longer receiving real-time updates. As is illustrated, a section that is frozen may be indicated by an indicator 150 having a snowflake icon associated with a highlighting of the affected sections, although it will be understood that other indicators 150 may take various forms and appear in various locations in the documents 120 or UIs 130 in addition to those illustrated herein so as to indicate to users that a section is no longer receiving real-time updates.

FIG. 1F illustrates a progression from FIG. 1E in which a range of text is pasted by the first computing device 110A into the second paragraph 144A. As is illustrated, the text that was deleted from the first paragraph 141A is pasted into the second paragraph 144A on the first computing device 110A. In the illustrated example, pasting has been determined to be an unsafe change for real-time updates and therefore second paragraph 144B on the second computing device 110B has been frozen. Because second paragraph 144B is frozen, the paste action will not be implemented in real-time on the second computing device 110B as it is displayed on the first computing device 110A.

As is illustrated, because the second paragraph 144B in the second document 120B has been frozen, and the user of the first computing device 110A has focus in the second paragraph 144A, a first cursor 160A is shown only in the first document 120A. In some aspects, a cursor 160 may be shown in or in proximity to a frozen section to indicate that the user that froze the section last had focus in the frozen section.

FIG. 1G illustrates a progression from FIG. 1F in which a table element is changed. As is illustrated in FIG. 1G, a title element of table object 143A has been changed from "Gallia" to "Gaul" on the first computing device 110A. According to various aspects, tables may be determined to be unsafe to update in real-time and any edit to a table, such as table object 143A, will freeze the corresponding sections on endpoint devices that the table defines or resides in. When a section is frozen on an endpoint, no further real-time updates are implemented in that section on the endpoint. In various aspects, the freezing of a section may be the result of the endpoint temporarily ceasing to implement future real-time updates that it receives from editors to a given section, or it may be the result of an editor ceasing to transmit future real-time updates to the endpoint.

In the illustrated examples, the table object 143 includes several subsections (e.g., cells) in which text and numbers are entered. Although changing text may generally be determined to be safe for implementation via real-time updates, because the subsections are associated with a section or object that is determined to be unsafe, edits to the subsections affect the parent and will therefore be considered unsafe. Other edits to a section that is deemed unsafe, such as, for example, changing a theme or a color, resizing, adding/removing subsections, reordering subsections, moving the section, etc., will cause the section to be frozen on endpoints.

Similarly, if an object in a section that has not been determined to be unsafe is an object that is determined to be unsafe is changed, the section will be frozen. For example, if hyperlink objects are determined to be unsafe objects, and text paragraphs are not determined to be unsafe sections, when a hyperlink object is added to a text paragraph's section (e.g., manually added, pasted, automatically created via an autocorrect function when typing a web address), that section may be frozen. Objects that may be deemed unsafe include, but are not limited to: hyperlinks, comments, tables, footnotes, endnotes, form fields, images, charts, active controls, and other objects that may be determined to be too complex or too large to implement as a real-time update on an endpoint.

FIG. 1H illustrates a progression from FIG. 1G in which a color of an image is changed. As is illustrated, a user of the first computing device 110A may select the image object 142A and choose to change the color of the image object 142A or a subsection thereof. In various aspects, images may be deemed to be unsafe to implement changes to in real-time, but in other aspects, images may not be deemed to be unsafe or certain changes may be deemed safe for an otherwise unsafe object. In the example illustrated in FIG. 1H, changing a color may be deemed a safe change, in which case the endpoint may implement the change in real-time.

FIG. 1I illustrates a progression from FIG. 1H in which the image object 142A is moved. In contrast to the example given in FIG. 1H, in which a color change deemed safe is illustrated as being implemented in a real-time update, changing an image's position (e.g., moving, rotating) may be deemed unsafe and therefore is illustrated as resulting in freezing the corresponding image object 142B. Although in some aspects, an image may be deemed as safe to implement changes to in real-time, certain changes may be deemed unsafe for an otherwise safe object. In the example illustrated in FIG. 1I, changing a position may be deemed an unsafe change, in which case the corresponding object may be frozen on the endpoint the change is not implemented in real-time.

FIGS. 1H and 1I illustrate that objects may have exceptions to their classifications as safe/unsafe to update in real-time. Exceptions may exist for simple or small changes to sections that are otherwise deemed unsafe to update in real-time. Similarly, exceptions may exist for complex or large changes to sections that are otherwise deemed safe to update in real-time.

FIG. 1J illustrates a progression from FIG. 1I in which further changes are made by the editor to sections corresponding to frozen sections. As is illustrated, the user of the first computing device 110A has typed the word "Gallia" at the beginning of the second paragraph 144A, and deleted the word "Qui" from the third line of the second paragraph 144A. When a section is frozen, as are sections 141B, 142B, 143B, and 144B, only the endpoints are prevented from making edits to those sections; the user who initiated those changes may continue to make changes to the corresponding sections in the document 120 on the editor.

FIG. 1K illustrates a progression from FIG. 1J in which a selected-time update of the documents 120 is illustrated. When a selected-time update occurs, such as when the document is saved, either on a periodic/scheduled basis (e.g., auto-saved) or when a user manually selects to save the document, changes made since a section was frozen are implemented. Accordingly, the first document 120A and the second document 120B now display identical content and any sections that were frozen have been unfrozen.

A selected-time update may be implemented in either a push, in which an editor initiates a selected-time update that is sent out to the endpoints, or a pull, in which an endpoint initiates a selected-time update that is taken from the editors, operation. In various aspects, a pull operation may update only the endpoint requesting the update or, alternatively, cause all endpoints in the coauthoring environment 100 to be updated. As will also be appreciated, when multiple editors have initiated freezes to sections in a document 120, a selected-time update may require information from several editors to be assembled and distributed to the endpoints (including the other editors). Updates may be managed by the coauthors or as a service proved by a server enabling a coauthoring environment.

Because a selected-time update is not implemented in real-time, the systems and applications involved may have a greater period of time to resolve potential conflicts between backing stores for changes that have been deemed unsafe (and subsequent safe changes). As will be appreciated, a selected-time update, depending on the size, number, and complexity of the changes to be resolved, may introduce brief periods of unresponsiveness to the clients of coauthors receiving changes, which is generally undesirable. Therefore, some aspects of a selected-time update may include a cool down period, during which time a new selected-time update may not occur (whether system or user generated), which may prevent excessive use of selected-time updates and any accompanying periods of unresponsiveness. In various aspects, a coauthor may save a document being coauthored during the cool down period, for example, as a local save, a new document, or as a cached instance that will be transmitted to other coauthors when the cool down period expires. In other aspects, locally initiated saves commands have the same effect as a selected-time update initiated elsewhere in the system (e.g., a server or other coauthor). In another aspect, selected-time updates are only performed on a periodic basis, which may prevent multiple users from requesting successive selected-time updates and causing their coauthors to experience periods of unresponsiveness.

FIG. 1L illustrates a progression from FIG. 1K in which both computing devices 110 have made changes that have frozen a section of the corresponding documents 120. As illustrated, the first computing device 110A is the editor for table object 143A, which has had the text for three subsections edited, and has frozen corresponding table object 143B on the second computing device 110B, which is the endpoint for this change. As is also illustrated, the second computing device 110B is the editor for image object 142B, which has been rotated, and has frozen corresponding image object 142A on the first computing device 110A, which is the endpoint for this change. The first computing device 110A and the second computing device 110B simultaneously access the document 120 and may make changes that cannot be implemented in real-time on the other computing device 110, which results in the section in which the change occurred being frozen in the coauthor's copy of the document 120.

FIG. 1M illustrates a progression from FIG. 1L in which both computing devices 110 have made edits to a section of the documents 120 that is not frozen. As is illustrated, the first computing device 110A and the second computing device 110B have made edits simultaneously to the second paragraph 144, which is not frozen in either device's respective document 120. For example, a first computing device 110A may have applied a bold format to the word "Gallia" at the beginning of the second paragraph 144A, and the word "Gallia" in corresponding second paragraph 144B may be updated in real-time. Similarly, a user of the second computing device 110B may have added an additional sentence to the end of the second paragraph 144B, which is implemented on the first computing device 110A in real-time. In the coauthoring environment 100 described herein, the real-time changes may be implemented simultaneously with one another. For example, the change to the formatting of the word "Gallia" is implemented on the second computing device 110B at the same time as the addition of the last sentence is implemented on the first computing device 110A.

As multiple computing devices 110 may access the same section simultaneously to provide the other computing devices 110 with real-time updates, any one of the computing devices 110 may potentially make a change that is not safe to implement in real-time on the other computing devices 110. When a change that is not safe to implement in real-time is made, the editor will retain control of the section to which the change is made and the endpoints to that change will have the section frozen. For example, if the first computing device 110A had made a change to the second paragraph 144A that is deemed unsafe, the second computing device 110B will be prevented from making more changes to the second paragraph 144B or receiving additional real-time updates to the second paragraph 144B from the first computing device 110A; second paragraph 144B will be frozen. Because either computing device 110 may be an editor or an endpoint, either computing device 110 may have sections of the document 120 frozen due to changes made by the other computing device 110 that are unsafe to implement in real-time, and each computing device 110 may display the appropriate indicators 150 to alert users to sections being frozen—either in their documents 120 or their coauthors' documents 120.

FIG. 1N illustrates a progression from FIG. 1M in which a selected-time update of the documents 120 is illustrated. Similar to the selected-time update discussed in relation to FIG. 1K, the selected-time update illustrated in FIG. 1N may be initiated by either computing device, syncs the content between the first document 120A and the second document 120B, and unfreezes any frozen sections.

Figure 2:
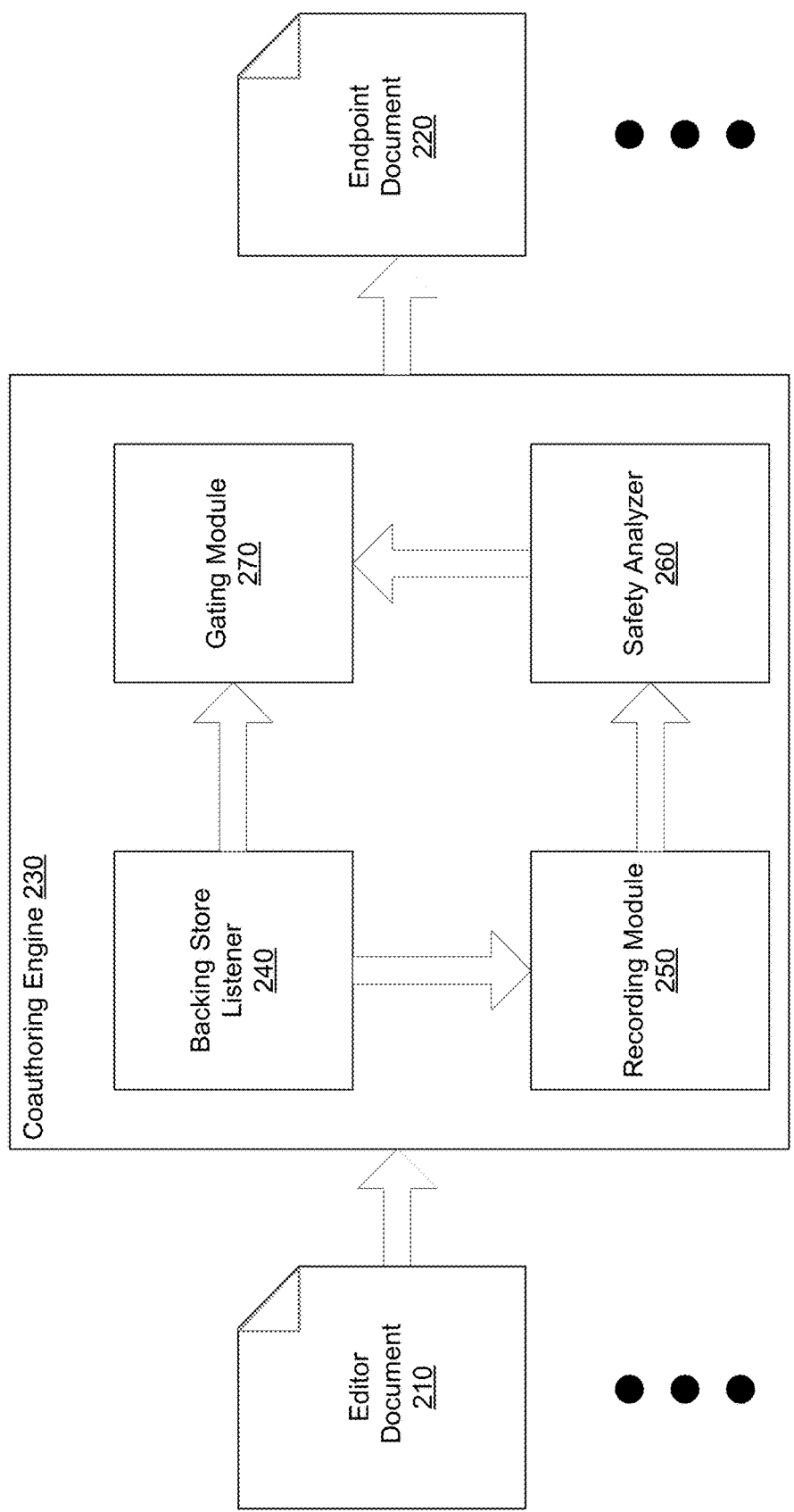
FIG. 2 is a block diagram of a suitable system operable to enable real-time and selected-time updates when coauthoring documents.

FIG. 2 is a block diagram of a suitable system 200 operable to enable real-time and selected-time updates when coauthoring documents 120. As illustrated, changes originate in an editor document 210, and are transmitted to an endpoint document 220. As illustrated in FIG. 2, and as discussed above, multiple editors may communicate changes to multiple endpoints as documents 120 are coauthored. Whether a change is implemented before a selected-time update as part of a real-time update or the endpoint waits to implement the change in a selected-time update in the endpoint document 220 depends on whether the change is determined to be safe or unsafe to implement in real-time. A coauthoring engine 230 is therefore provided to determine whether a change is safe or unsafe to be implemented in real-time. Changes may be due to user input (e.g., typing, inserting) or system input (e.g., autocorrecting, auto-formatting) that originates at the editor.

In various aspects, the coauthoring engine 230 may be part of the editor, and operable to determine whether changes are safe to transmit from the editor document 210 to be implemented in the endpoint document 220. In other aspects, the coauthoring engine 230 may be part of an endpoint, and operable to determine whether a change received from the editor document 210 is safe to implement in real-time in the endpoint document 220. In yet other aspects, both the editor and the endpoint may incorporate coauthoring engines 230 as described above. In further aspects, components of the coauthoring engine 230 may be shared as a distributed system between the editors and endpoints. In alternative aspects, the coauthoring engine 230 may be provided locally, for example, as a component or a plug-in to an application used for coauthoring, or provided remotely by a server to the coauthors as a service to enable coauthoring or enhance the coauthoring user experience.

When both the editor document 210 and the endpoint document 220 incorporate or are provided with coauthoring engines 230, the coauthoring engines 230 may be operable to work on a safe-bias or an unsafe-bias combined analysis. For example, when the coauthoring engines 230 are different versions, such as when different applications are used by the editor and the endpoint to coauthor the document 120, the coauthoring engine 230 of the endpoint may determine a change is safe to implement in real-time whereas the coauthoring engine 230 of the editor may determine that a change is unsafe to implement in real-time, or vice versa. In an unsafe-bias, both the editor and the endpoint must agree that a change is safe to implement in real-time for it to be implemented on the endpoint, while in a safe bias, the change will be deemed safe to implement unless both the editor and the endpoint agree that the change is not safe to implement in real-time. In other aspects, the coauthoring engine 230 of either the editor or the endpoint is given complete control to determine whether a change is safe to implement in real-time.

The coauthoring engine 230 includes a variety of components, including a backing store listener 240, a recording module 250, a safety analyzer 260, and a gating module 270. Each of these components comprises code executing on a suitable computing system, as described herein.

A backing store listener 240 is illustrated as a component of the coauthoring engine 230, and is operable to selectively listen to low level activities in the backing store of an editor document 210. Low level activities occurring in the backing store of a document 120 are those activities that modify the content of the document 120. A low level activity includes sufficient information to determine the section of the editor document 210 to which a change is being made, where the change is made in that section, and what the change is. For example, a low level activity may indicate that the letter "a" is to be input at a given position in a given paragraph. In another example, a low level activity may indicate that a selected feature (e.g., line, fill, shadow) in an image is to have the color "red" applied. A low level activity is a single change to the content of the editor document 210. Example low level activities include inserting, deleting, or replacing a character, feature, structure, or other object in a document 120.

In contrast, a high level activity may include several low level activities, such as, for example, a paste command, which inserts one or more characters, structures, or other objects from a clipboard, wherein each insertion would be a separate low level activity. Example high level activities include cut commands, paste commands, undo commands, redo commands, autocorrect functions, and other commands that affect multiple low level activities, such as deleting a range (e.g., multiple text characters, pictures, tables, etc.).

As changes are made to the editor document 210, the low level activities that comprise those changes are observed by the backing store listener 240 of the coauthoring engine 230. According to various aspects, the backing store listener 240 may be operable to listen to all changes to the backing store or only a portion of the changes made to a backing store. For example, when a section is frozen, the backing store listener 240 may stop listening for changes to the corresponding portion of the backing store. Similarly, in some aspects, the backing store listener 240 may not listen to changes made to any templates accessed by the backing store (e.g., page size, default font, style families, custom spellcheck dictionaries, macros), but only listen for changes to the contents of the editor document 210 in the backing store.

A recording module 250 is illustrated as a component of the coauthoring engine 230, and is operable to receive the activities observed by the backing store listener 240 to create a record of the change. When a change includes multiple low level activities (e.g., a high level activity), those low level activities may be assembled into a record by the recording module 250 to represent all of the low level activities that comprise a given change in the editor document 210. Similarly, several related low level activities may be grouped together to be analyzed in batches; for example, the low level activities for adding each letter of a word may be grouped together.

A safety analyzer 260 is illustrated as a component of the coauthoring engine 230, and is operable to determine whether a given change is safe to implement in real-time in the endpoint document 220. The safety analyzer 260 is operable to determine whether a given low level activity or high level activity is safe to implement in real-time. The determination of whether a change is safe or unsafe is a representation of the expected likelihood of whether the change, if implemented in real-time, would result in the corruption of the backing store of an endpoint document 220 or the mis-display of the change on an endpoint document 220. Depending on the backing stores of the editor documents 210 and the endpoint documents 220, different expected likelihoods of corruption/mis-display may exist. For example, if the backing store of the editor document 210 is associated with the WORD® word processing application for use on desktop computing devices, and the backing store of the endpoint document 220 is associated with the OFFICE 365™ suite of online application's backing store, (both provided by MICROSOFT CORPORATION of Redmond, Wash.) a different assessment of a change's likelihood of causing corruption/mis-display may be made than if both the editor document 210 and the endpoint document 220 use the same backing store.

In various aspects, a risk-tolerance threshold may allow the safety analyzer 260 to determine whether a change is safe. For example, a user may set a high risk-tolerance threshold to allow the safety analyzer 260 to determine that more changes are safe to implement, such as when the user values additional real-time updates over the risk of corruption or mis-display. In another example, the user may set a low risk-tolerance threshold to have the safety analyzer 260 determine that fewer changes are safe to implement in real time, such as when the user is more sensitive to the risk of corruption or mis-display of a change during coauthoring.

In various aspects, the safety analyzer 260 may operate under a fail-safe basis, where a change is deemed unsafe unless it is determined to be safe, or a fail-unsafe basis, where a change is deemed safe unless it is determined to be unsafe. For example, the safety analyzer 260 may consult a whitelist to determine that a low level activity is safe, or a blacklist to determine that a low level activity is unsafe. Whitelists and blacklists may contain references to specific low level activities that are safe/unsafe, specific high level activities that are safe/unsafe, specific objects that are safe/unsafe to apply given activities to, and logic to determine whether a quantity of low level activities comprising a high level activity render the high level activity safe/unsafe to implement in real-time. The 0 and blacklists may be integrated into the editors and endpoints, or may be hosted by servers accessible by both editors and endpoints so that each coauthor is using the same list and the list may be updated by a central authority. As will be understood, when discussing a determination of whether an activity or change is "safe" or "unsafe," both the fail-safe and fail-unsafe bases of determining whether an activity or change is safe, not safe, unsafe, or not unsafe are included.

Low level activities are analyzed to determine whether those activities are inherently safe to be implemented in real-time. Low level activities that are determined to be inherently unsafe will affect any high level activity that they comprise, and that high level activity (and thereby all other low level activities that comprise the high level activity) will be deemed unsafe to implement in real-time for the given change.

High level activities are analyzed to determine whether those activities are inherently safe to be implemented in real-time. In various examples, whether a high level activity is inherently safe may depend on the section or the object in the document 120 to which it is applied. For example, a paste command is a high level command that may be safe to implement in a paragraph of text, but unsafe to implement in a cell of a table. The safety analyzer 260 is therefore capable of analyzing the section that activities are destined to affect.

The safety analyzer 260 is further operable to analyze high level activities to determine whether high level activities that would otherwise be determined safe should be reclassified as unsafe due to the size or complexity of the change. For example, a paste command for inserting text from a clipboard may ordinarily be determined to be safe, but when the number of text characters held by the clipboard exceeds a limit, the high level activity will be determined to be unsafe in this instance as it is too large to implement in real-time. Similarly, if the system uses paragraphs as sections for the document 120, the paste operation may be deemed too complex to implement in real-time if the clipboard contains multiple paragraphs, and therefore deemed unsafe in this instance.

Because high level activities may be implemented differently by the editor document 210 and the endpoint document 220 (such as when they are opened by different versions of a word processing application, presentation graphics program, messaging application, text editor, or a different application), the determination of what is too large or complex an otherwise safe change to make in real-time may include several otherwise safe changes that might be cascaded across several sections of a document 120. For example, if deleting ranges of text, deleting a comment, and deleting a paragraph are all considered safe changes, but a user deletes a paragraph having a comment anchored within, that change may cascade to delete any comments anchored within that paragraph, and to delete any text within those comments. This cascading edit may be handled differently by the backing stores of the editor and the endpoint, and it therefore may be determined to be unsafe, even though all the component high level and low level activities are deemed to be safe.

According to some aspects, the safety analyzer 260 may also determine whether a section to which a change is made in the editor document 210 is frozen in the endpoint document 220. When an editor knows that it has frozen a section in the endpoint documents 220, future changes to that section by the editor may be deemed unsafe until a selected-time update occurs and the section is unfrozen. According to additional aspects, when an endpoint knows that a section in the endpoint document 220 is frozen, any changes received from the editor to that section may be deemed unsafe.

A gating module 270 is illustrated as a component of the coauthoring engine 230, and is operable to receive the activities observed by the backing store listener 240 and the determination made by the safety analyzer 260 of whether the change is safe, to enable the implementation of safe changes in real-time in the endpoint document 220. The changes from the editor may be translated into a schema to interpret and implement the changes on the endpoint. The schema may also include freeze information, so that a section is frozen when an unsafe change has been made by the editor.

Because the editors and endpoints in a coauthoring environment may use multiple different backing store models (e.g., different versions of the same application, different applications), the schema is used as a shared format by which the editors and endpoints may interpret a change. For example, an editor may implement the activities comprising the change using a continuous positioning system (e.g., objects are given sequential addresses in the document) to indicate where a change occurred, whereas an endpoint may use a sectional positioning system (e.g., each section is given an address within the document and each object in the section is given an address within the section). In another example, editors and endpoints may use a different order of operations when implementing a change, which may introduce corruption or mis-display if the endpoint enacted the editor's change verbatim. Translating the change into a shared schema provides a common reference point by which editors and endpoints may interpret the change into their backing store models.

According to various aspects, a variety of formats for schema may be used when implementing the safety-checked real-time updates. For example, the schema may be in a Java Script Object Notation (JSON) format. In another example, the schema may be in an eXtensible Markup Language (XML) format. Other formats for schema may also be used so long as the translated changes in the schema are mutually intelligible by the editors and endpoints in a coauthoring environment.

Figure 3:
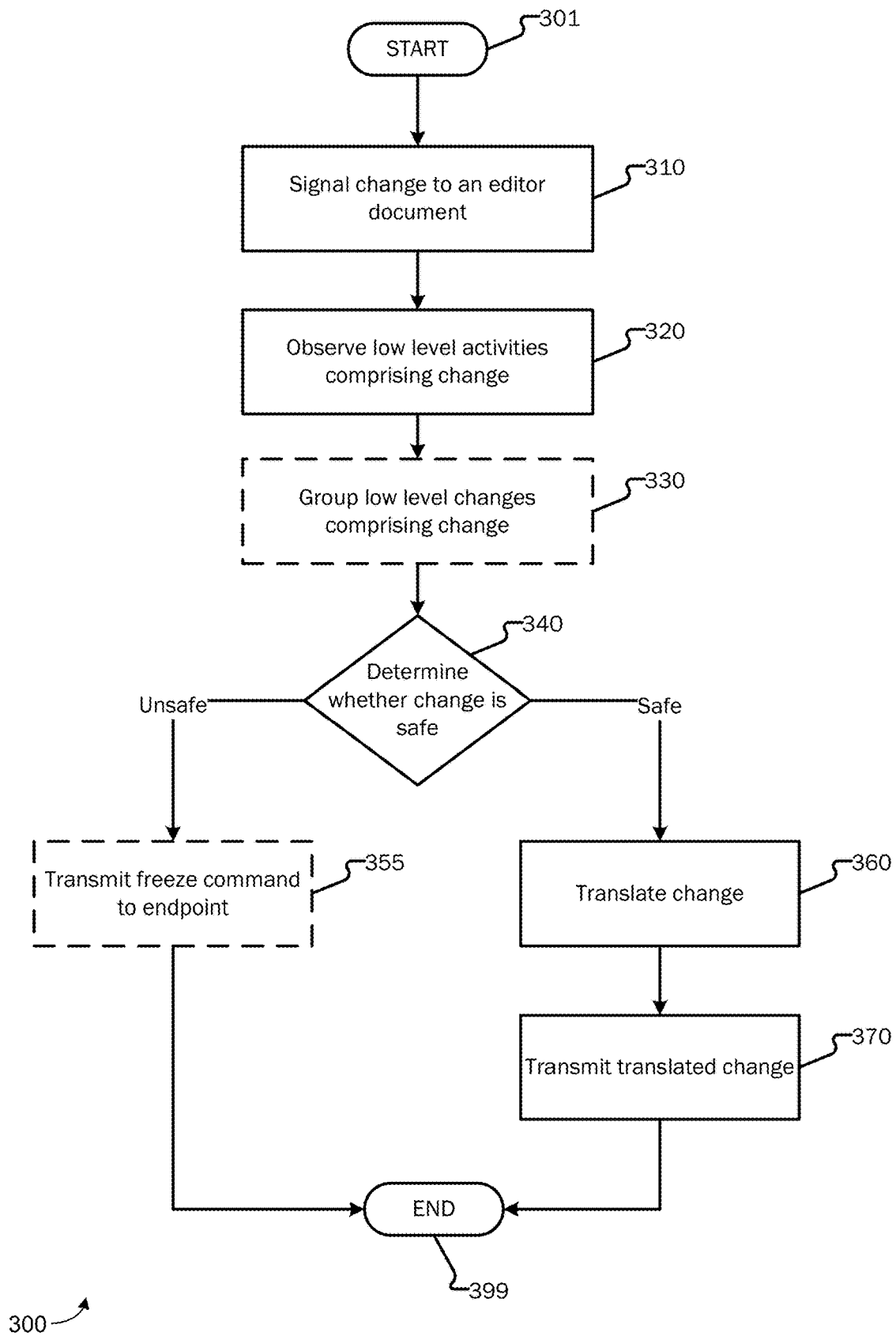
FIG. 3 is a flow chart showing general stages involved in an example method for implementing real-time updates in reference to an editor transmitting changes to an endpoint.

FIG. 3 is a flow chart showing general stages involved in an example method 300 for implementing real-time updates in reference to an editor transmitting changes to an endpoint. Although method 300 references a single endpoint, multiple endpoints may be transmitted the same changes from the editor.

Method 300 begins at START 301 and proceeds to OPERATION 310 where a change is signaled to be made to an editor document 210 being coauthored. Signals to make a change include hardware input (e.g., keyboard, microphone via speech recognition, mouse), UI implemented commands, autocorrect commands, etc. In various aspects, the change made to the editor document 210 is to the contents of the document, while in other aspects, the change may be made to the template (e.g., page size, default font, style families, custom spellcheck dictionaries, macros, etc.). The change may affect the backing store of the editor document 210 as a low level activity or a high level activity.

At OPERATION 320 the low level activities that comprise the change are observed. Listeners in the backing store may observe the low level activities as they occur in the backing store of the editor document 210, which may be grouped at OPTIONAL OPERATION 330. At OPTIONAL OPERATION 330 low level activities may be grouped, such as, for example, when several low level activities comprise a high level activity, or when several low level activities are related or entered within a predefined time period (e.g., 1 s, 2 s).

Method 300 then proceeds to DECISION OPERATION 340, where the change is analyzed to determine whether it is safe to implement in real-time on an endpoint. The determination of whether a change is safe to implement in real-time reflects the expected likelihood of whether the change, if implemented in real-time, would result in the corruption of the backing store of an endpoint document 220 or the mis-display of the change on an endpoint document 220. The determination may be affected by the versions of the backing stores used by coauthors, a risk tolerance, an analysis of the safety of the individual low level activities, an analysis of the optionally grouped low level activities (e.g., high level activities), and/or whether the section the change is made to is frozen on the endpoint.

In various aspects, the editor may perform an analysis of the low level activities individually and in aggregate to determine whether a change is safe, and in other aspects, the editor may deem all changes and activities safe, leaving the true analysis to the endpoint. In further aspects, the editor may analyze the activities, and the endpoint may also analyze the activities, which may be done according to fail-safe and fail-unsafe bases for each coauthor and a safe-bias or an unsafe-bias combined analysis between the two coauthors.

When it is determined that a change is not safe to implement in real-time, method 300 may proceed to OPTIONAL OPERATION 355 where freeze information is transmitted to the endpoint, to implement a freeze on the corresponding section to which an unsafe change was made by the editor, at which point method 300 concludes at END 399. In some aspects, the change is transmitted along with the freeze information, which the endpoint may ignore to implement the change, while in other aspects, the freeze information is sent without sending the change. Additionally, when freeze information is sent, the editor may note that the change has frozen sections on endpoints, such as, for example, by displaying an indicator 150 in proximity to the section frozen, as illustrated in FIGS. 1E-J, 1L, and 1M. In yet other aspects, such as coauthoring environments in which freezes are not enabled, method 300 may omit OPTIONAL OPERATION 355, not transmit the change to the endpoint, and conclude at END 399.

Freeze information, in various aspects, may include processed information sent from the editor to the endpoint as a command and unprocessed information that the endpoint interprets to determine whether to implement as a freeze. The editors and endpoints may determine from the freeze information that a given section is frozen or to be frozen by comparing the state of the given section, such that when the state of the section on the endpoint and the state of the section on the editor do not match, the section will be determined to be frozen. States of given sections affected by changes may be included in the freeze information in the form of identifiers, such as, for example, vector clocks, revision identifications, checksums, or hash values. For example, an editor may make three sequential changes, of which the first and third changes are transmitted to the endpoints, but the second is deemed unsafe, and therefore is not transmitted to the endpoints. When the third change is transmitted, the transmitted indicator may be compared to a local indicator on the endpoints to determine that the third change was based on a different state from what the endpoints have (e.g., a state that includes the second change), and therefore should be ignored by the endpoints or discarded.

When it is determined that a change is safe to implement in real-time, method 300 will proceed to OPERATION 360, where the change will be translated from the low level activities used by the editor into a schema to implement the change in real-time. In various aspects, the schema may be a JSON, XML, or other schema by which multiple applications, with potentially different backing store models, may use as a shared format. In some aspects, the schema may include an indication of or a reference to the editor's determination of the change's safety, which the endpoint may use to reject a change that the editor determined as safe, to deem that change as unsafe on the given endpoint.

Method 300 then proceeds to OPERATION 370, where the translated change is transmitted to the endpoint. In various aspects, the change may be transmitted directly from the editor to the endpoint or routed across a network including intermediate server or servers hosting the document being coauthored. Method 300 then concludes at END 399.

Figure 4:
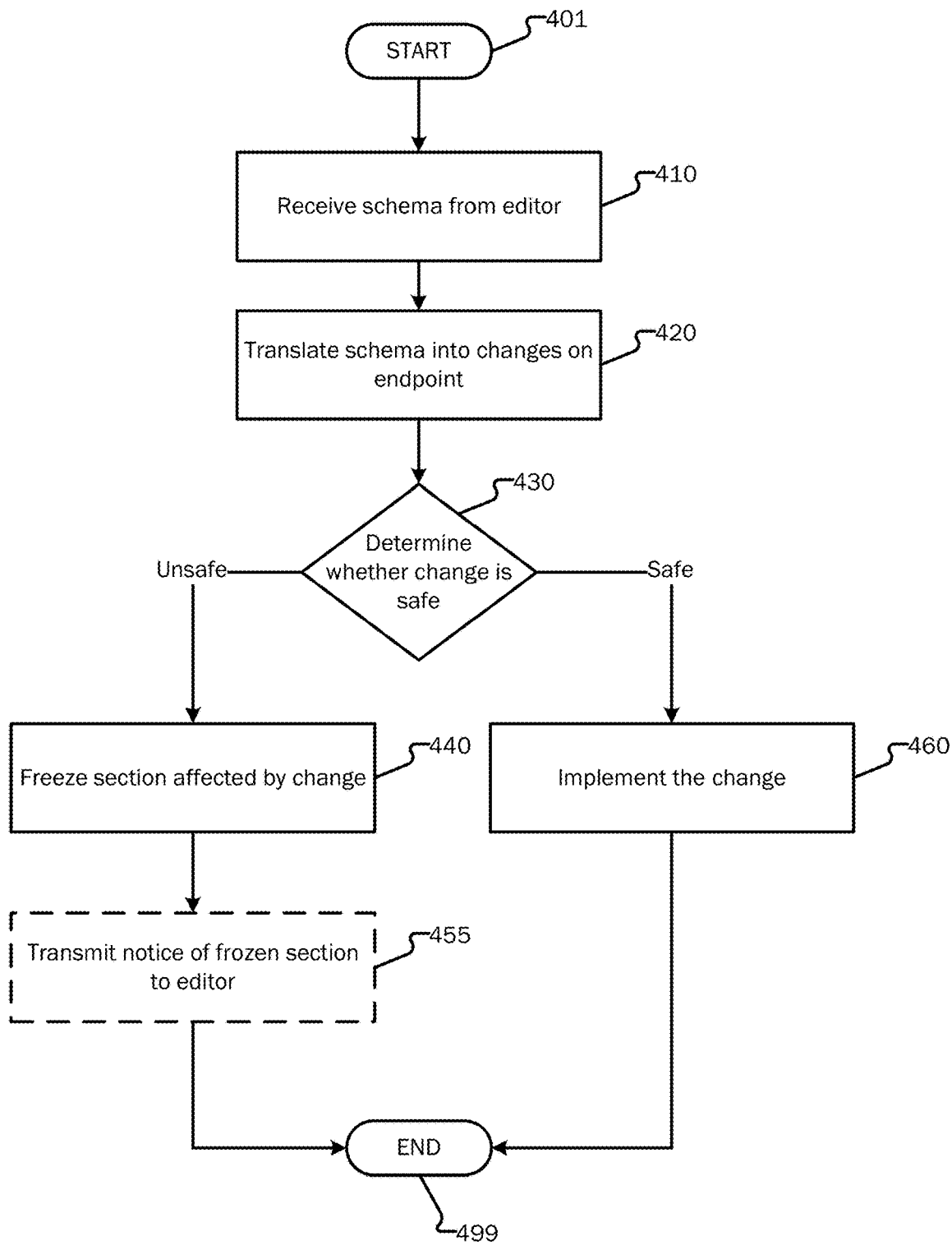
FIG. 4 is a flow chart showing general stages involved in an example method for implementing real-time updates in reference to an endpoint receiving changes from an editor.

FIG. 4 is a flow chart showing general stages involved in an example method 400 for implementing real-time updates in reference to an endpoint receiving changes from an editor. Although method 400 references a single editor, an endpoint may receive changes from multiple editors.

Method 400 begins at START 401 and proceeds to OPERATION 410, where a schema for a real-time update is received from an editor. Editors may transmit schemas for each change as it is made in the editor so that the endpoint may display the changes in real-time while coauthoring a document with the editor. In various aspects, the schemas may include notation of the change in a format mutually intelligible by the editor and the endpoint, as well as freeze information to indicate a section that has had a change made that is unsafe to implement in real-time on the endpoint. In various other aspects, a schema including processed freeze information may omit the unsafe change that initiated the freeze, or a schema with an unsafe change may not include processed freeze information; the endpoint may determine whether the change is safe or unsafe to implement in real-time by comparing the state of the section from the editor to the state of the section on the endpoint.

The schema received in OPERATION 410 is translated at OPERATION 420 from the format that is mutually intelligible by the editor and the endpoint into the format used in the backing store model of the editor. By using a mutually intelligible format, coauthors may make use of editors and endpoints using different models for their respective backing stores. This also enables legacy document models to have a coauthoring engine 230 installed as a plug-in, extension module, or service provided by a server to enable coauthoring where before it was not possible. For example, a version of the WORD® word processing application (provided by MICROSOFT CORPORATION of Redmond, Wash.) deployed before coauthoring features were implemented may be upgraded to enable coauthoring. In another example, a coauthoring engine 230 may be deployed to enable coauthoring between two different word processing applications, such as, for example, WORD® and a competing word processing application.

Method 400 then proceeds to DECISION OPERATION 430, where it is determined whether it is safe to implement the change made by the editor in real-time on the endpoint. In aspects where the editor has analyzed the safety of the change, the endpoint may rely on the analysis made by the editor and not perform an analysis of its own. Alternatively, the endpoint may perform its own analysis and discard (or ignore) the editor's analysis, or use the editor's analysis along with its own in either a safe-bias or an unsafe-bias combined analysis.

When it is determined that a change is unsafe to implement in real-time on the endpoint, method 400 proceeds to OPERATION 440, where the section on the endpoint corresponding to the section on the editor to which the change was made is frozen on the endpoint. In various aspects, the frozen section may be indicated to a user of the endpoint by highlighting the section or via an indicator 150 when the freeze occurs, as illustrated in FIGS. 1E-J, 1L, and 1M. In other aspects, the frozen section will not be indicated to a user until the user attempts to make a change to the frozen section.

Method 400 may perform OPTIONAL OPERATION 455 when a section is frozen on the endpoint to transmit a notice to the editor that the section was frozen. When an editor is informed that a section has been frozen, such as, for example, when an endpoint decides that a change that the editor determined was safe is unsafe, the editor may cease transmitting schema that reference the frozen section, which may reduce network traffic and device processing requirements in a coauthoring environment. Additionally, if the editor performs an analysis of the safety of a change before transmitting a schema of that change to the endpoint, the editor may take the frozen status of the section into account in its analysis.

When it is determined that a change is safe to implement in real-time on the endpoint, method 400 proceeds to OPERATION 460, where the change is implemented. The change originating from the editor may be due to user input (e.g., typing, inserting) or system input (e.g., autocorrect, auto-formatting) and will be implemented on the endpoint automatically in real-time, such that a user of the endpoint will see the changes as if they were made directly on the endpoint in real-time per the rules used by the editor.

By using the rules of the editor in real-time updates, the endpoint is assured of accurately displaying what the editor is displaying. For example, if the editor has an autocorrect rule enabled that the endpoint does not, which corrects the typo "hte" to the word "the", when "hte" is input on the editor, the endpoint will (if safe) display the input of "hte" as changes and will then display "hte" autocorrecting to "the" as a change. In contrast, if the editor did not have the above autocorrect rule enabled and the endpoint did have the rule enabled, input of "hte" would be displayed on the endpoint, but the autocorrection from "hte" to "the" would not occur on the endpoint as the input of "hte" it did not originate on the endpoint. According to aspects, the endpoint may be prevented from automatically applying its rules to alter changes received from the editor to prevent looping changes between coauthors (e.g., to prevent coauthors using different spelling rules from autocorrecting "colour" to "color" back to "colour", ad nauseam).

After method 400 implements the safe change in real-time or freezes the section of an unsafe change, method 400 concludes at END 499.

Figure 5:
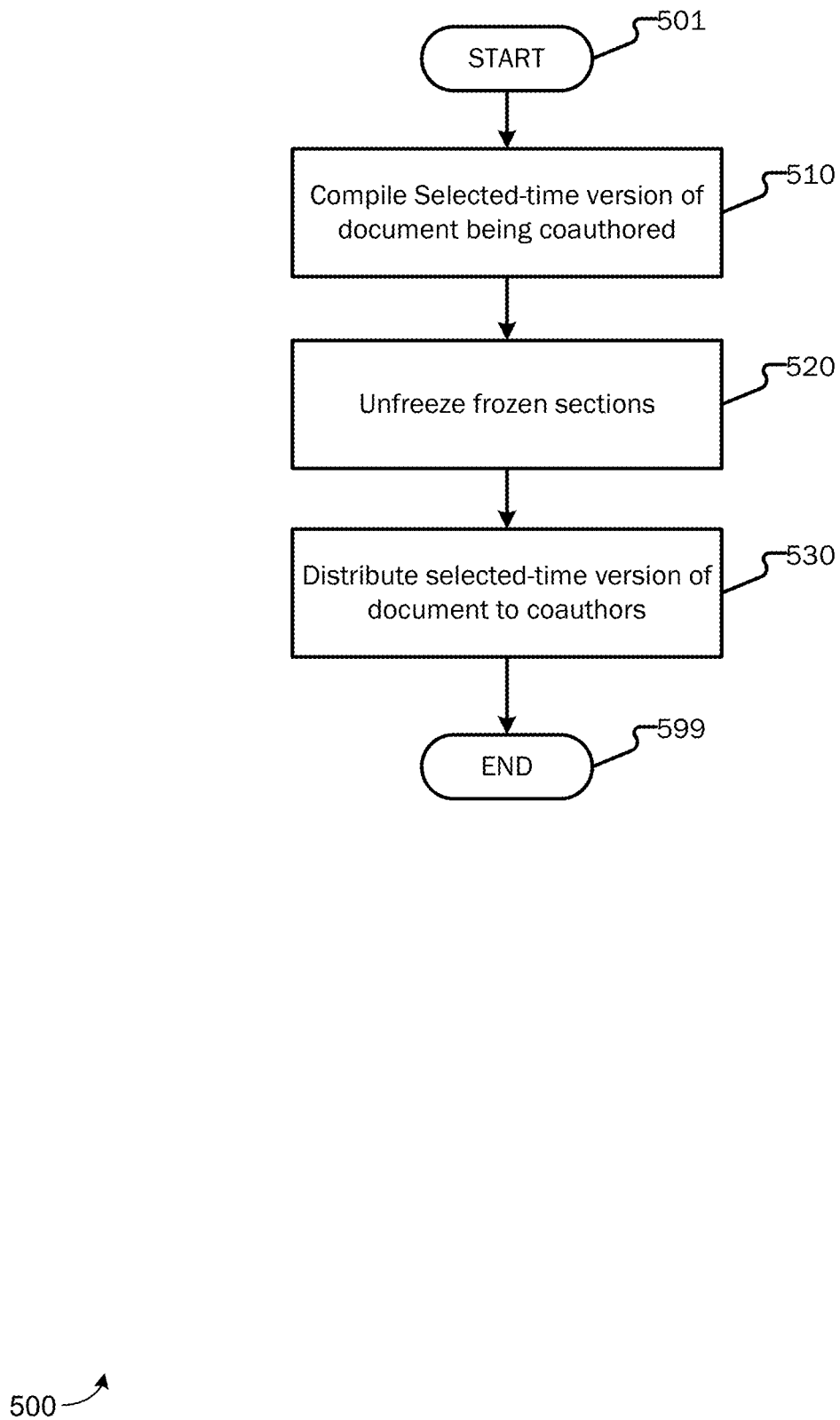
FIG. 5 is a flow chart showing general stages involved in an example method for effecting a selected-time update.

FIG. 5 is a flow chart showing general stages involved in an example method 500 for effecting a selected-time update. A selected-time update is not implemented in real-time, and the systems and applications involved may therefore have a greater period of time to resolve potential conflicts between backing stores for changes that have been deemed unsafe (and subsequent safe changes). Selected-time updates may occur when the document is saved (manually or automatically) and may be requested by an editor (e.g., a push operation) or an editor (e.g., a pull operation). In various aspects, the selected-time update may be managed by a server providing a coauthoring environment or by one of the coauthors.

Method 500 begins at START 501 and proceeds to OPERATION 510, where a selected-time version of the document 120 being coauthored is compiled. The selected-item version is a merged copy all the document 120 that includes all of the changes, whether safe or unsafe to implement in real-time. In various aspects, the changes may be collected in copy of the document 120 owned by a coauthor or in a copy the document 120 owned by a hosting server accessed by the coauthors.

At OPERATION 520, sections of the document that have been frozen due to an editor making a change that is not safe to implement in real-time are unfrozen. Because the selected-time update does not occur in real-time, additional time may be spent to resolve conflicts or mis-displays of changes that would be unsafe to implement in real-time. When these changes are resolved, any endpoints may safely display these changes and make additional changes to the sections that were frozen.

At OPERATION 530 the selected-time version of the document 120 is distributed to coauthors. The coauthors receiving the selected-time update will then have access to the version of the document 120 from the editor that includes changes made by the particular editor, both safe and unsafe to implement in real-time, that occurred since the last selected-time update. In various aspects, all coauthors may receive a selected-time update, and in other aspects, such as, for example, when a given editor requests a pull update, only the endpoint requesting the selected-time update may receive the update.

Method 500 then concludes at END 599.

While the present disclosure has been described in the general context of program modules that execute in conjunction with an application program that runs on an operating system on a computer, those skilled in the art will recognize that examples and aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
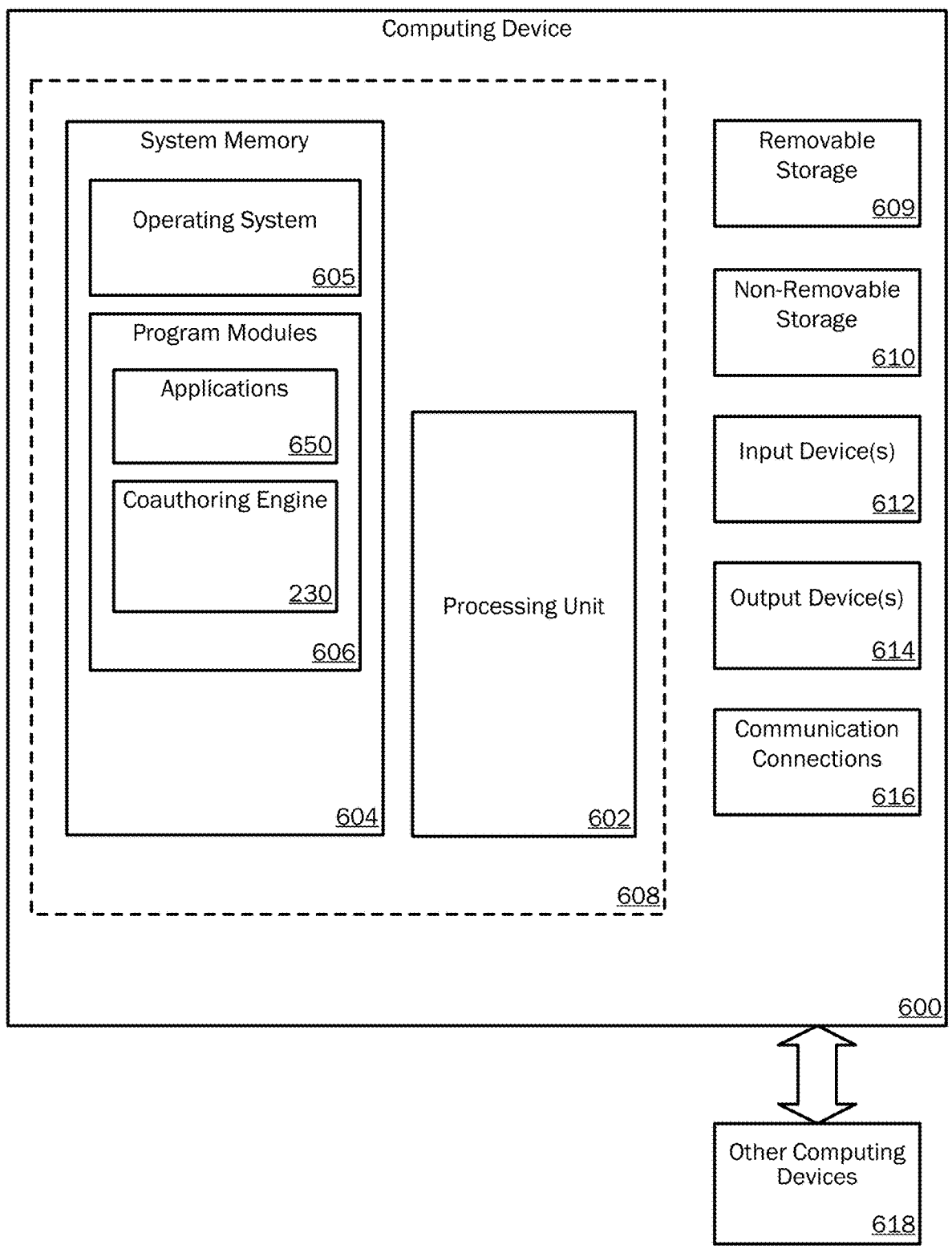
FIG. 6 is a block diagram illustrating physical components of a computing device with which examples may be practiced.
Figure 7A:
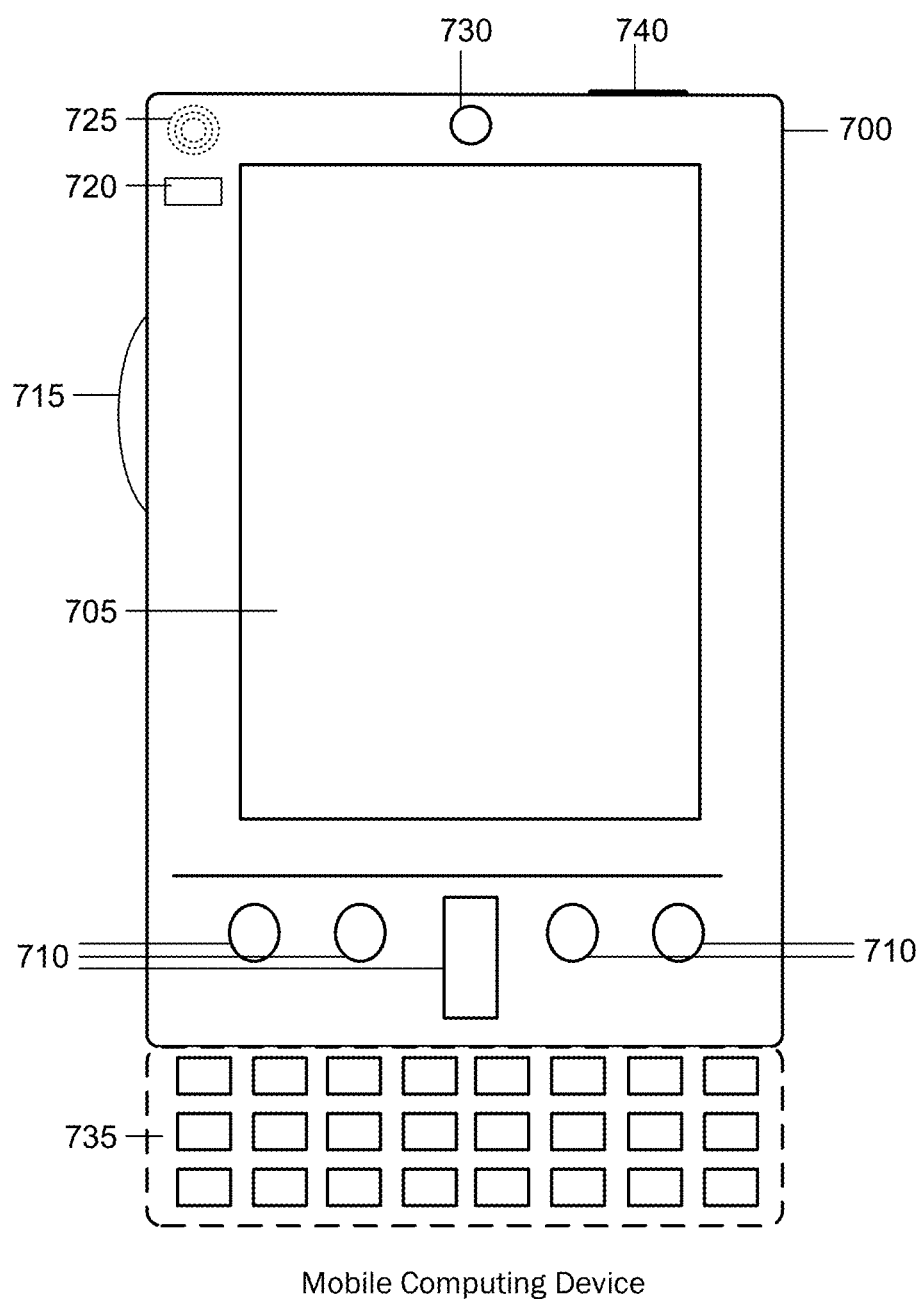
FIGS. 7A and 7B are simplified block diagrams of a mobile computing device with which aspects may be practiced.
Figure 7B:
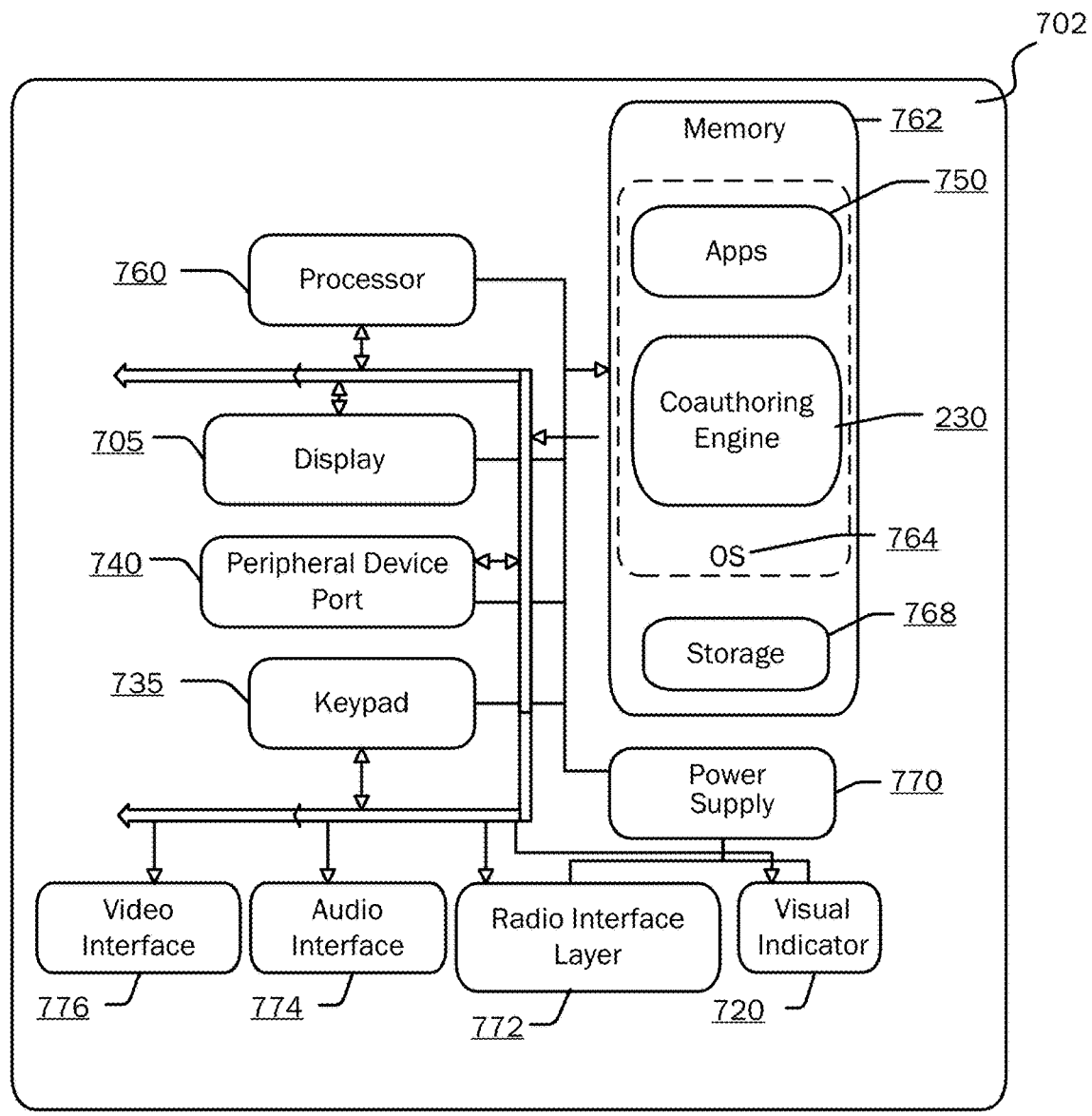
Figure 8:
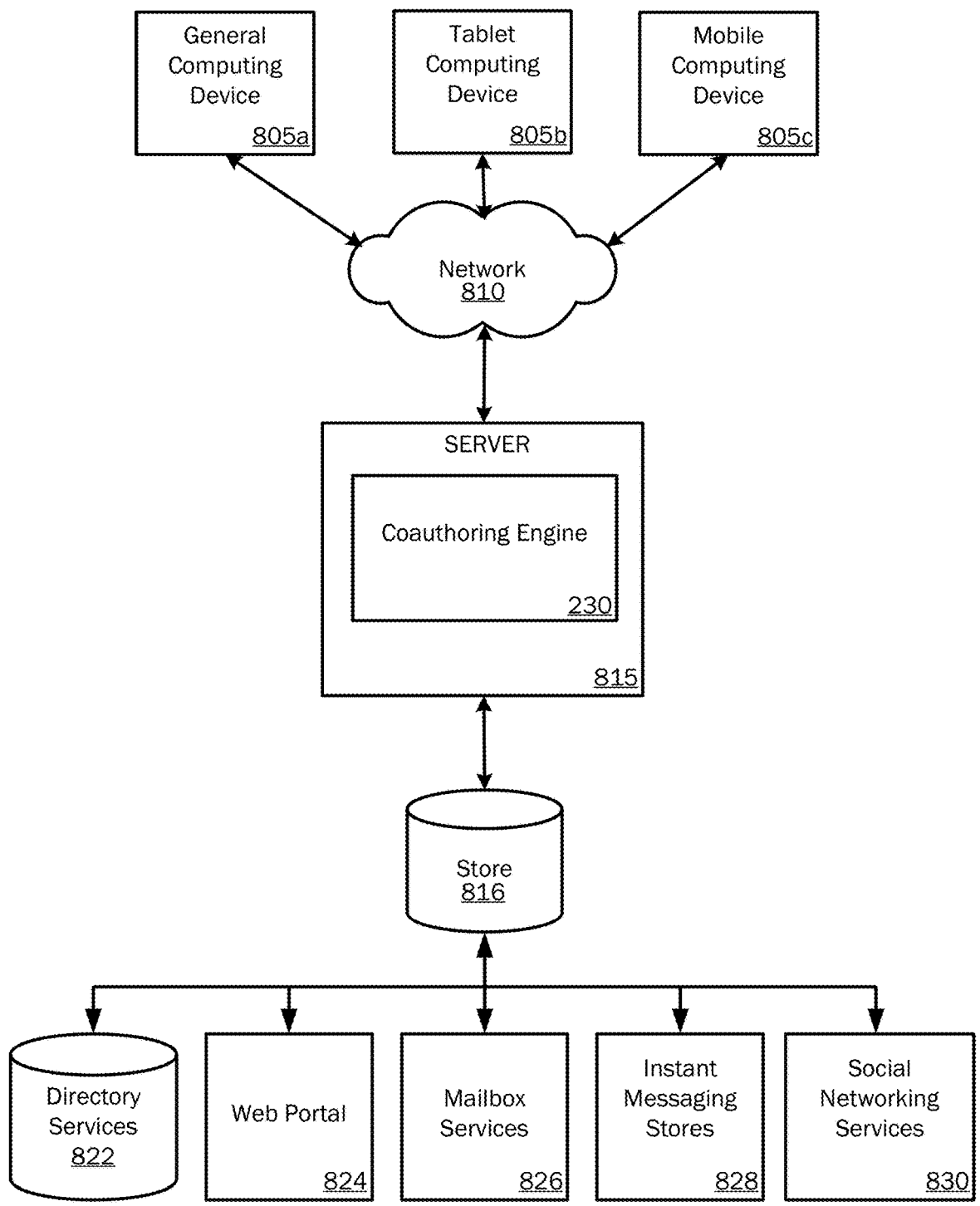
FIG. 8 is a simplified block diagram of a distributed computing system in which aspects may be practiced.

FIGS. 6-8 and the associated descriptions provide a discussion of a variety of operating environments in which examples may be practiced. However, the devices and systems illustrated and discussed with respect to FIGS. 6-8 are for purposes of example and illustration and are not limiting of a vast number of computing device configurations that may be utilized for practicing aspects of the present disclosure.

FIG. 6 is a block diagram illustrating physical components (i.e., hardware) of a computing device 600 with which examples may be practiced. The computing device components described below may be suitable for the computing devices 110 described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 650, such as editors and endpoints. According to an aspect, the system memory 604 may include the coauthoring engine 230. The operating system 605, for example, may be suitable for controlling the operation of the computing device 600. Furthermore, aspects may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., editors, endpoints, coauthoring engine 230) may perform processes including, but not limited to, one or more of the stages of the methods 300, 400, and 500 illustrated in FIGS. 3, 4, and 5. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples may be practiced in an electrical circuit comprising discrete electronic elements, packaged or integrated electronic chips containing logic gates, a circuit utilizing a microprocessor, or on a single chip containing electronic elements or microprocessors. For example, examples may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 600 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects may be practiced within a general purpose computer or in any other circuits or systems.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, or transceiver circuitry; universal serial bus (USB), parallel, or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative examples, mobile computing device 700 may incorporate more or less input elements. For example, the display 705 may not be a touch screen in some examples. In alternative examples, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), or an audio transducer 725 (e.g., a speaker). In some examples, the mobile computing device 700 incorporates a vibration transducer for providing the user with tactile feedback. In yet another example, the mobile computing device 700 incorporates peripheral device ports 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 can incorporate a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

One or more application programs 750, for example, editors and endpoints, may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the coauthoring engine 230 may be loaded into memory 762. The system 702 also includes a non-volatile storage area 768 within the memory 762. The non-volatile storage area 768 may be used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

The visual indicator 720 may be used to provide visual notifications or an audio interface 774 may be used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

FIG. 8 illustrates one example of the architecture of a system for providing data visualization as described above. Content developed, interacted with, or edited in association with editors, endpoints, or the coauthoring engine 230 may be stored in different communication channels or other storage types. For example, various documents may be stored using a directory service 822, a web portal 824, a mailbox service 826, an instant messaging store 828, or a social networking site 830. The editors, endpoints, or the coauthoring engine 230 may use any of these types of systems or the like for providing data visualization, as described herein. A server 815 may provide editors, endpoints, or the coauthoring engine 230 to clients 805A-C. As one example, the server 815 may be a web server providing the editors, endpoints, or the coauthoring engine 230 over the web. The server 815 may provide the editors, endpoints, or the coauthoring engine 230 over the web to clients 805 through a network 810. By way of example, the client computing device may be implemented and embodied in a personal computer 805A, a tablet computing device 805B or a mobile computing device 805C (e.g., a smart phone), or other computing device. Any of these examples of the client computing device may obtain content from the store 816.

Aspects of the present disclosure, for example, are described above with reference to block diagrams or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the present disclosure as claimed in any way. The aspects, examples, and details provided in this application are considered sufficient to convey possession and enable others to make and use the best mode of present disclosure. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A system for improving functionality of a computing device participating in a coauthoring environment by recording a change in an editor document of a coauthored document made by an editor executing a first coauthoring application for safe transmission over a network in real-time to an endpoint document of the coauthored document at an endpoint executing a second coauthoring application, comprising:
  a processing device configured to read and execute instructions stored in hardware memory, the execution of the instructions causing the processing device to:
    perform as a backing store listener operable to receive a change to a backing store of the editor document to observe one or both of a low level activity and a high level activity that comprises the change;
    perform as a recording module operable to receive one or both of the low level activity and the high level activity observed by the backing store listener to create a record of the change;
    perform as a safety analyzer operable to analyze the record of the change and determine whether the change is safe to implement in real-time, wherein the change is safe to implement when analysis of the record of the change indicates that the change, when implemented in real-time within the endpoint document, will not corrupt a backing store of the endpoint document, wherein analysis of the record of the change includes assessing the record of the change against a whitelist of one or both of a known low level activity or a known high level activity that are safe to implement in real time or a blacklist of one or both of a known low level activity or a known high level activity that are unsafe to implement in real time; and
    perform as a gating module operable to translate the change into a schema intelligible by the endpoint, and further operable to, in response to determining that the change is safe to implement in real-time, transmit the schema to the endpoint.

2. The system of claim 1, wherein the recording module is further operable to group multiple low level activities into a new high level activity to enable the safety analyzer to analyze one or both of the new high level activity and the multiple low level activities that comprise the change to determine whether the change is safe to implement in real-time.

3. The system of claim 1, wherein the schema is formatted according to Java Script Object Notation (JSON) and includes an identifier indicating a state of the editor document.

4. The system of claim 1, wherein the schema includes a transmitted identifier operable to indicate a status of a section affected by the change, wherein the transmitted identifier corresponds to an endpoint identifier and enables the endpoint to discard the change when the identifier and the endpoint identifier do not match.

5. The system of claim 1, wherein the record of the change indicates a type of section of the editor document affected by the change, wherein the type of section includes at least one of:
  a word;
  a sentence;
  a paragraph;
  an image;
  a header;
  a footer;
  a comment;
  a document;
  a footnote;
  an endnote;
  a table;
  a chart; and
  a text box.

6. The system of claim 1, wherein the safety analyzer is further operable to determine whether the change is safe to implement in real-time based on a number of low level activities comprising the change.

7. The system of claim 1, wherein the endpoint uses a different backing store than the editor.

8. The system of claim 1, wherein if the safety analyzer determines that the change is not safe to implement in real-time, the change is not transmitted in real-time to the endpoint.

9. The system of claim 8, wherein if the change is not transmitted in real-time, the change is transmitted in selected-time.

10. A method for improving functionality of a computing device participating in a coauthoring environment by recording a change of an editor document of a coauthored document made by an editor for safe transmission over a network in real-time to an endpoint, comprising:
  receiving a change to the editor document;
  observing one or both of a low level activity and a high level activity that comprise the change;
  analyzing the change made to the editor document to determine whether the change is safe to be implemented in real-time on an endpoint document of the coauthored document at the endpoint, wherein the change is safe to implement when analysis of the change, when implemented in real-time within the endpoint document, will not corrupt a backing store of the endpoint document, wherein analyzing the change includes assessing the change against a whitelist of one or both of a known low level activity or a known high level activity that are safe to implement in real time or a blacklist of one or both of a known low level activity or a known high level activity that are unsafe to implement in real time;
  when it is determined that the change is safe to implement, translating the change into a schema and transmitting the schema to the endpoint in real time; and
  when it is determined that the change is unsafe to implement, translating the change into a schema and transmitting the schema to the end point at a selected time that is delayed relative to real time.

11. The method of claim 10, wherein analyzing the change to determine whether the change may be implemented safely in real-time on the endpoint further comprises analyzing at least one of:
  a number of low level activities comprising the change;
  a new high level activity assembled from the low level activities; and
  an object affected by the change.

12. The method of claim 10, further comprising:
  transmitting a selected-time update of the editor document to the endpoint whereby the endpoint is enabled to update each section of the endpoint document based on the selected-time update.

13. The method of claim 12, wherein the selected-time update is transmitted in response to the editor implementing a save of the editor document.

14. The method of claim 12, wherein the selected-time update occurs periodically in response to an auto-save operation.

15. A method for improving functionality of a computing device participating in a coauthoring environment by recording a change to an editor document at an editor for safe transmission over a network in real-time to an endpoint document at an endpoint, comprising:
  receiving at the endpoint a schema transmitted by the editor, wherein the schema is mutually interpretable by the editor and the endpoint to indicate a change made by the editor to the editor document of a coauthored document, the change comprising one or both of a low level activity and a high level activity;
  analyzing the change made by the editor to the editor document to determine whether the change is safe to implement in the endpoint document of the coauthored document on the endpoint in real-time, wherein the change is safe to implement when analysis of the change indicates that the change, when implemented in real-time within the endpoint document, will not corrupt a backing store of the endpoint document, wherein analyzing the change includes assessing the change against a whitelist of one or both of a known low level activity or a known high level activity that are safe to implement in real time or a blacklist of one or both of a known low level activity or a known high level activity that are unsafe to implement in real time;
  when it is determined that the change is safe to implement, implementing the change in real-time in the endpoint document on the endpoint;
  when it is determined that the change is not safe to implement, freezing a section of the endpoint document on the endpoint corresponding to a section of the editor document on the editor in which the change was made; and
  in response to receiving a selected-time update, unfreezing the section of the endpoint document on the endpoint and implementing the change.

16. The method of claim 15, wherein the whitelist is hosted by a server accessible to the editor and the endpoint.

17. The method of claim 15, wherein analyzing the change to determine whether the change is safe to implement in the endpoint document on the endpoint in real-time further comprises:
  comparing a state of the section of the editor document on the editor with a state of the section of the endpoint document on the endpoint.

* * * * *